United States Patent [19]
Kobayashi

[11] Patent Number: 5,708,873
[45] Date of Patent: Jan. 13, 1998

[54] FLASH PHOTOGRAPHING SYSTEM

[75] Inventor: Ryuichi Kobayashi, Tokyo, Japan

[73] Assignee: Canon Kabushiki Kaisha, Tokyo, Japan

[21] Appl. No.: 638,231

[22] Filed: Apr. 26, 1996

[30] Foreign Application Priority Data

May 8, 1995 [JP] Japan ................. 7-109627

[51] Int. Cl.[6] ............................................. G03B 15/05
[52] U.S. Cl. .................................................. 396/159
[58] Field of Search .............................. 354/416, 417, 354/415; 396/159, 172

[56] References Cited

U.S. PATENT DOCUMENTS

| | | | |
|---|---|---|---|
| 3,868,701 | 2/1975 | Kawasaki | 354/416 X |
| 4,266,163 | 5/1981 | Lloyd | 354/416 X |
| 4,297,011 | 10/1981 | Adams, Jr. | 354/416 |
| 4,416,524 | 11/1983 | Takayama | 354/416 X |
| 4,702,585 | 10/1987 | Harada et al. | 354/410 |
| 5,130,737 | 7/1992 | Azuma et al. | 354/416 |
| 5,367,356 | 11/1994 | Kobayashi | 354/471 |

FOREIGN PATENT DOCUMENTS 3-29930  2/1991  Japan .

*Primary Examiner*—W. B. Perkey
*Attorney, Agent, or Firm*—Fitzpatrick, Cella, Harper & Scinto

[57] ABSTRACT

The present invention relates to a flash photographing system for, in a case where the same subject of the photographing operation is repeatedly flash-photographed, performing an automatic bracket photographing operation such that the quantity of flash light to be emitted at each operation is sequentially shifted by a predetermined quantity. According to the present invention, there is provided a system of the foregoing type having a structure such that previous light emission is performed to receive light reflected from an object, and the quantity of emitted light received until the quantity of reflected light reaches a predetermined value is stored as a reference light quantity. When the quantity of light to be emitted in each main light emission operation is controlled, the quantity of light in each main light emission operation is monitored so as to subject the monitored quantity of light and the reference data to a comparison. Thus, the quantities of light to be emitted in the main light emission operation are controlled in accordance with data about the quantities of light respectively shifted from said reference quantity of light by predetermined quantities.

18 Claims, 20 Drawing Sheets

FIG. 1

| FIG. 1A | FIG. 1B |

FIG. 1A

| FIG. 2A | FIG. 2B | FIG. 2C |

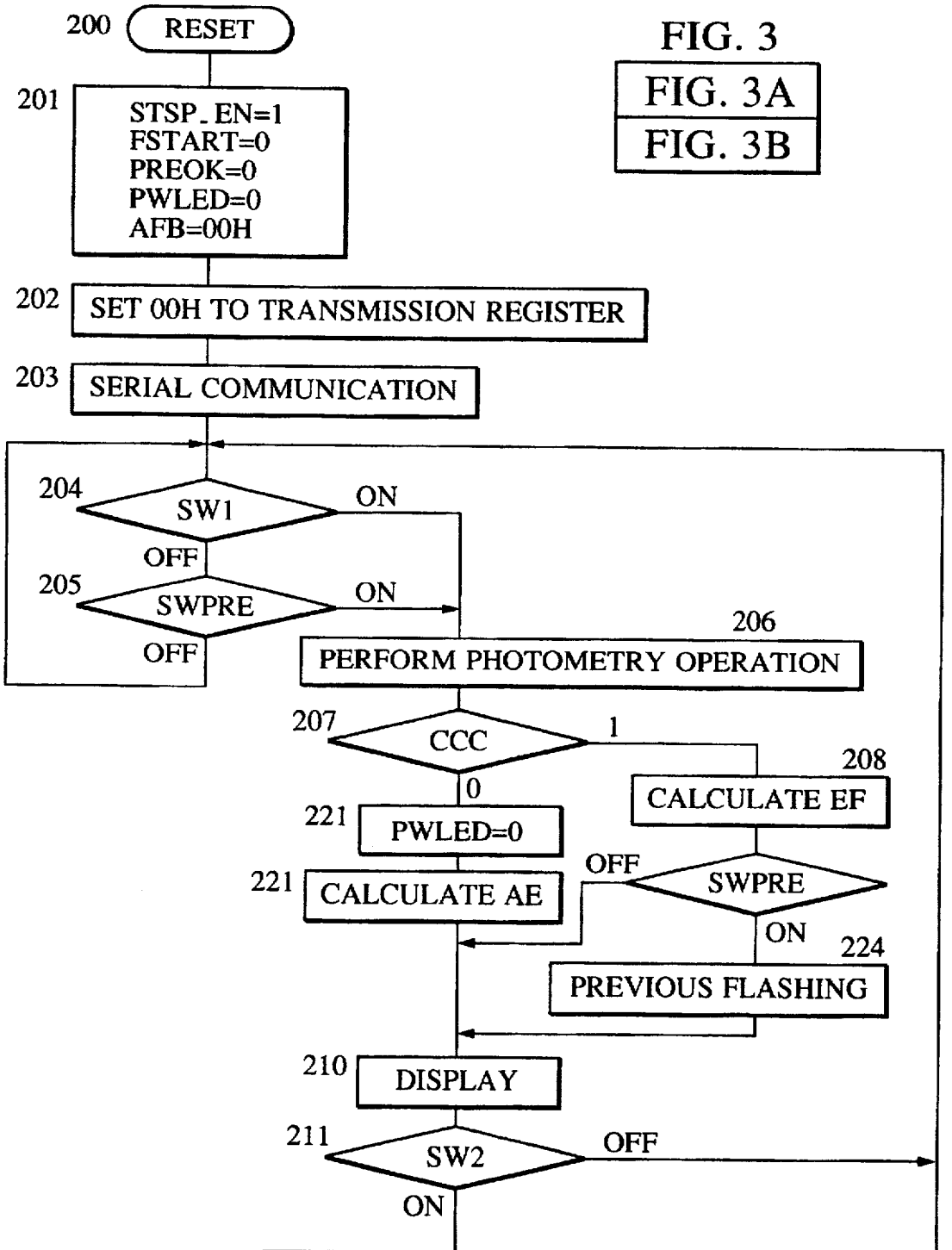

| FIG. 5A |
|---|
| FIG. 5B |

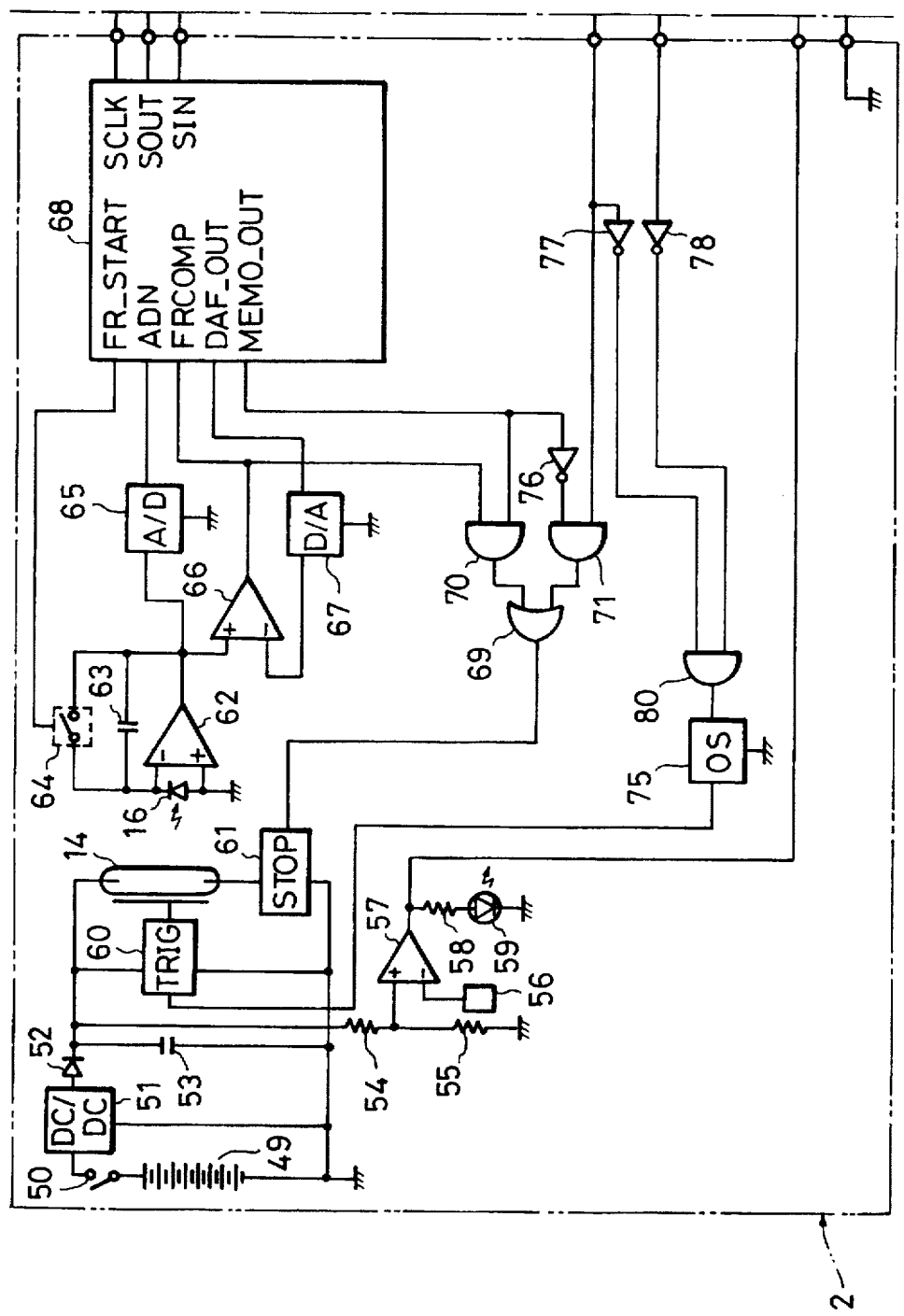

| FIG. 8A | FIG. 8B | FIG. 8C |

FLASH PHOTOGRAPHING SYSTEM

BACKGROUND OF THE INVENTION

1. Field of the Invention

The present invention relates to a camera for performing an automatic step-exposure photographing operation by stepwise shifting the quantity of light to be emitted from a stroboscope unit.

2. Related Background Art

In recent years, a camera has been developed which is capable of performing an automatic step-exposure (automatic bracketing) photographing operation in which the exposure condition is automatically and slightly shifted. Cameras of the foregoing type have been popular among persons, such as semiprofessional and professional cameramen having a sizable knowledge about photographic techniques.

A method of varying exposure for performing the automatic step-exposure has been classified into the following two methods.

(1) A first method is, as disclosed in, for example, Japanese Patent Laid-Open No. 3-29930, a so-called flash illumination light quantity variable method in which the quantity of light to be emitted from a stroboscope is stepwise changed for each frame when the step exposure photographing operation is performed. That is, as disclosed above, the foregoing method is an illumination light quantity adjustment method (adjustment quantity variable method) in which an object is illuminated with flash light; and if the result of integration of measured values of reflected light has reached the ISO sensitivity light quantity, then emission of flash light is interrupted so that the luminance of the object is adjusted.

(2) A second method is an aperture variable method in which the quantity of light to be emitted from the stroboscope is maintained at a predetermined value, and the amount of aperture of the diaphragm of the photographing optical system is changed so as to stepwise change the quantity of exposure.

However, the foregoing conventional two methods have the following problems.

(1) The first method involves unintentional change in the quantity of light reflected from an object if the attitude or the angle of view is changed for each frame of the film as is experienced when an object moving violently is photographed. Therefore, interruption of emission of flash light in accordance with the measured value of reflected light from the object at each photographing operation results in a predetermined step-exposure being impossible.

In a case where an object is positioned remotely and the object cannot appropriately be illuminated with light in a maximum light quantity for the stroboscope, the step exposure cannot be performed because the object cannot appropriately be illuminated even if the step exposure is set.

(2) The second method has the step of stepwise changing the exposure condition of the object by changing the aperture. Therefore, in a case where the step exposure of the foregoing type is performed, a picture cannot be taken with photographing techniques using the depth of field and/or out of focus.

The foregoing method must measure (or estimate) the distance to the object, set the amount of aperture in accordance with the luminance of the object and set an appropriate quantity of flash light corresponding to the foregoing distance and the amount of aperture before the photographing operation is performed. Therefore, the setting operation to be performed before the photographing operation is performed is too complicated for a user to easily use the camera.

SUMMARY OF THE INVENTION

An object of the invention is to provide a flash photographing system capable of reliably shifting quantity of flash light to be emitted at each flash photographing operation.

Another object of the invention is to provide a flash photographing system comprising a storage circuit for storing a reference quantity of emitted light detected by a detection circuit for detecting a reference quantity of emitted light by emitting flash light so that the quantity of light to be emitted at each photographing operation is determined in accordance with the quantity of emitted light stored in the storage circuit.

To achieve the foregoing objects, according to one aspect of the present invention, there is provided a flash photographing system comprising: a light-quantity detection circuit which detects light reflected from an object in a scene in which flash light is emitted from the flash unit so as to detect a reference quantity of light to be emitted in accordance with the quantity of reflected light; a setting circuit for setting data about quantity of light as data for use in performing each flash photographing operation, data about the quantity of light being, by a predetermined quantity, shifted from the reference quantity of light detected by the detection circuit; and a control circuit for, in accordance with data set by the setting circuit, controlling quantity of light to be emitted from the flash unit when the flash photographing operation is performed.

Another object of the present invention is to provide a system in which an automatic bracket photographing operation is inhibited in a case where the automatic bracket flash photographing operation cannot be performed so that a problem that the automatic bracket photographing operation is performed unsatisfactorily is prevented.

Other objects, features and advantages of the invention will be evident from the following detailed description of the preferred embodiments described in conjunction with the attached drawings.

DESCRIPTION OF THE PREFERRED EMBODIMENTS

Referring to FIGS. 1 to 6, an embodiment of the present invention will now be described.

Figure 6A:
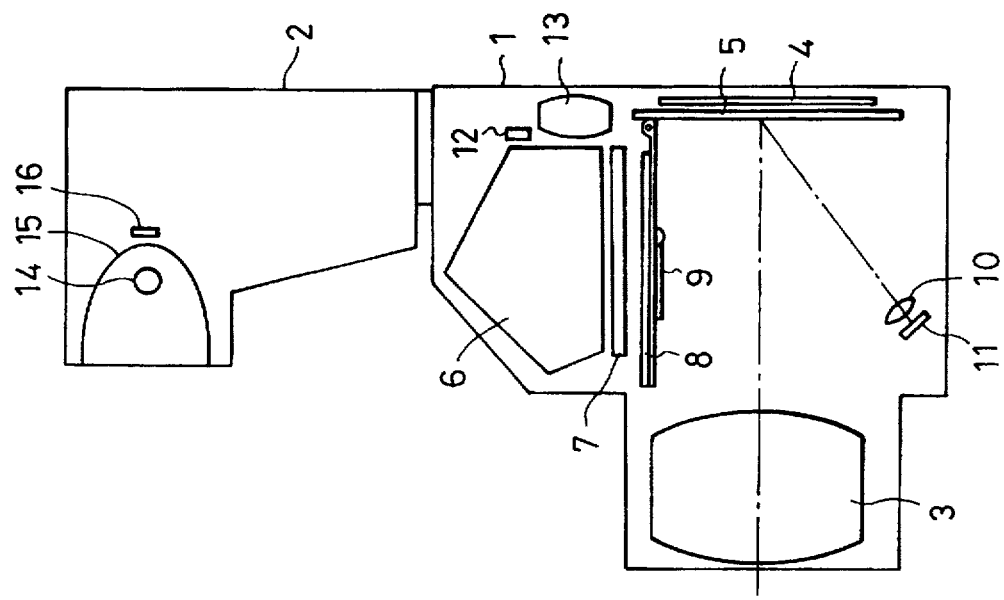
FIG. 6A is a schematic view showing the mechanical structure of the camera according to this embodiment in a state before a photographing operation is performed.

Referring to FIG. 6, the schematic mechanical structure of a camera according to the present invention will now be described.

Referring to FIG. 6, reference numeral 1 represents a body of the camera, 2 represents a stroboscope unit detachably mounted on the body 1 of the camera, 3 represents a photographing lens integrally or detachably mounted on the body 1 of the camera, 4 represents a film, 5 represents a shutter, 6 represents a pentagonal Dach mirror, 7 represents a focusing plate, 8 represents a main mirror consisting of half mirrors, 9 represents a sub-mirror, 10 represents a light converging lens, 11 represents a strobe light quantity adjustment photodiode for detecting the luminance of an object realized by strobe light, 12 represents a photometry photodiode, 13 represents a finder ocular lens, 14 represents a light emission tube comprising xenon discharge tube or the like, 15 represents a reflector, and 16 represents a photodiode for measuring the quantity of emitted strobe light. The mechanical structures of the foregoing elements are the same as those of a known camera.

In a state in which preparation for photographing operation is performed, a light beam from a main object passes through the photographing lens 3, the main mirror 8, the pentagonal Dach mirror 6 and the finder ocular lens 13 so as to be made incident upon the eye of a user of the camera. Simultaneously, a portion of the light beams scattered by the focusing plate 7 is made incident upon the photometry photodiode 12 so that the luminance of the main object is measured in accordance with the output from the photometry photodiode 12. A portion of the light beams passes through the main mirror 8 and then reflected by the sub-mirror 9. Then, it passes through the light converging lens 10 and then made incident upon the photodiode 11.

Figure 6B:
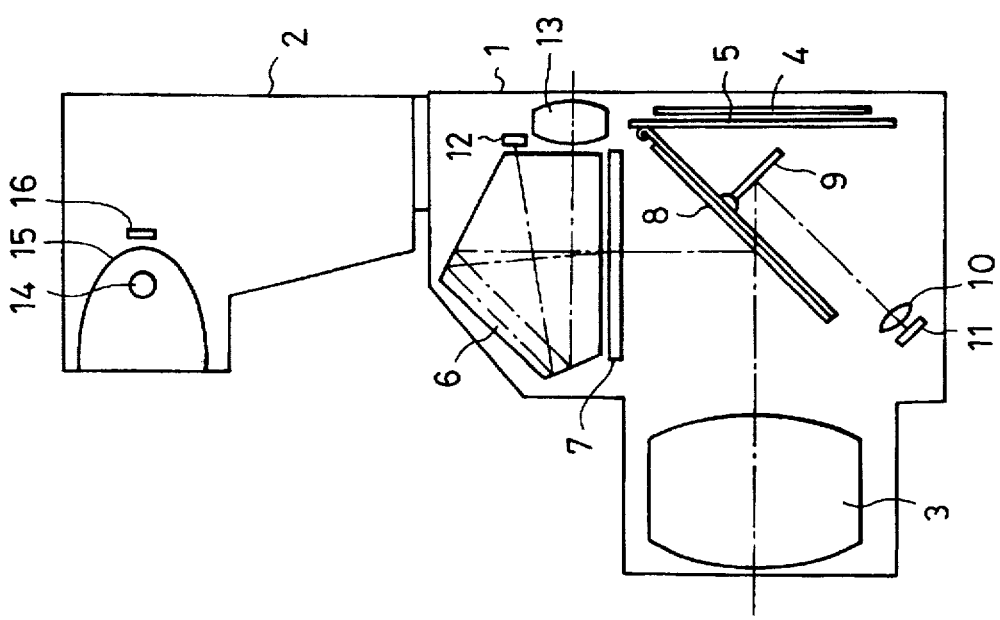
FIG. 6B is a schematic view of the mechanical structure of the camera in a state where a photographing exposure is performed.

When a picture is taken, the main mirror 8 is moved upwards as shown in FIG. 6B so that the light beam from the main object passes through the photographing lens 3 and then passes through an aperture of the shutter 5, followed by being made incident upon the film 4 so that the picture of the main object is exposed to light and taken. A portion of the light beams is reflected by the surface of the film 4 and then, through the light converging lens 10, made incident upon the photodiode 11 for adjusting light.

Figures 1, 1A:
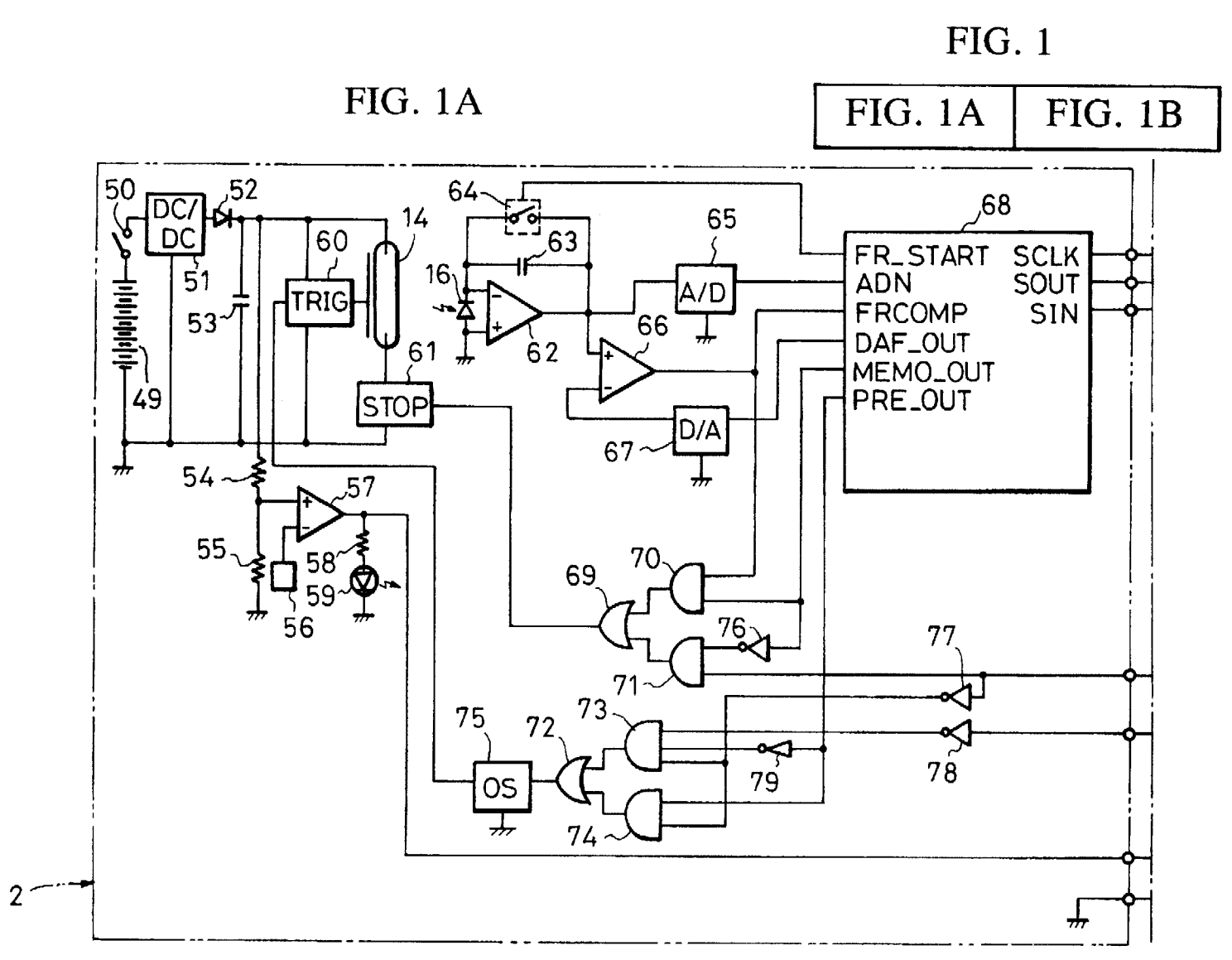
Figure 1B:
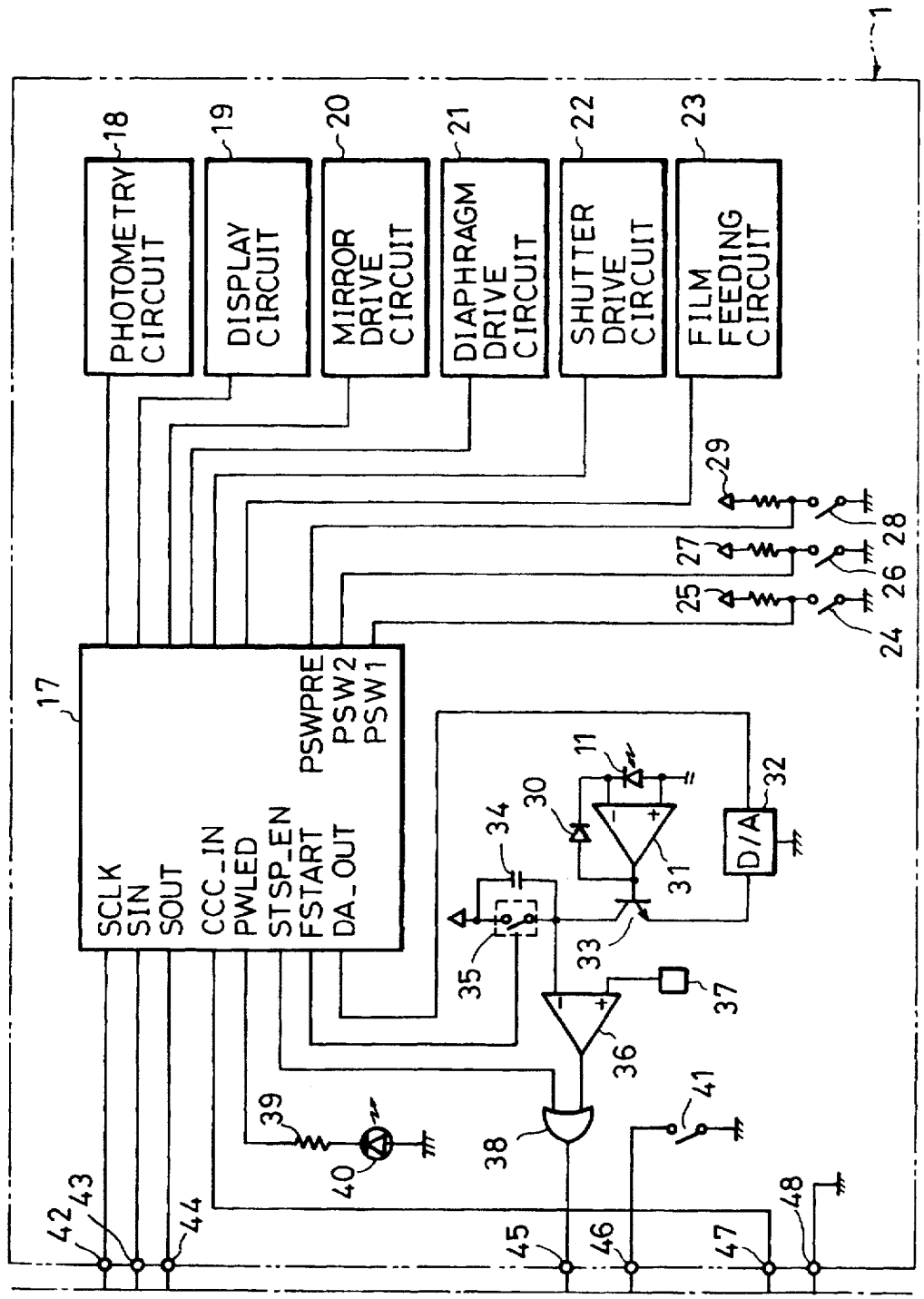
FIG. 1 consisting of FIGS. 1A and 1B, is a schematic view showing the electrical structure of a camera according to a first embodiment of the present invention.

Referring to FIG. 1, the body 1 of the camera and the electric elements included in the stroboscope unit 2 will now be described.

Referring to FIG. 1, reference numeral 1 represents the body of the camera, and 2 represents the stroboscope unit.

Electric elements in the body 1 of the camera will now be described.

Reference numeral 17 represents a microcomputer mounted on the body 1 of the camera (hereinafter abbreviated as "microcomputer for the camera"), 18 represents a photometric circuit for measuring the luminance of an object in accordance with an output from the photometry photodiode 12 (see FIG. 6), 19 represents a display circuit for controlling a display unit (not shown) and display in a finder, 20 represents a mirror operating circuit for elevating the main mirror 8, 21 represents a diaphragm operating circuit for operating a diaphragm (not shown) disposed in the photographing lens 3, 22 represents a shutter control circuit for controlling the shutter 5, 23 represents a film feeding control circuit for controlling winding and rewinding of the film, 24 represents a switch (hereinafter called a "SW1") which is switched on in synchronization with a first stroke depressing operation of a shutter release button (not shown) disposed in the body 1 of the camera, 25 represents a pull-up resistance for intensifying a signal from the SW1, 26 represents a switch (hereinafter called a "SW2") which is switched on in synchronization with a second stroke depressing operation of the shutter release button, 27 represents a pull-up resistance for intensifying a signal from the SW2, 28 represents switch (hereinafter abbreviated as "SWPRE") which is switched on in synchronization with the operation of a pre-light-emission button (not shown) which is operated when the stroboscope unit 2 is operated to previously emit light, 11 represents the light-adjusting photodiode for measuring the luminance of the object when the stroboscope unit 2 emits light, 30 represents a diode, in parallel, connected to a calculation amplifier 31 and forming a logarithmic compression circuit together with the calculation amplifier 31, 33 represents a transistor which is operated in accordance with an output of the logarithmic compression circuit, 32 represents a D/A converter for setting an output current of the transistor 33 in response to a signal transmitted from the microcomputer 17 for the camera, 34 represents a light-adjusting capacitor for storing charges of corrector currents of the transistor 33, 35 represents an analog switch which short-circuits the light-adjusting capacitor 34 when switched on in response to a signal transmitted from the microcomputer 17 for the camera to discharge charges stored in the light-adjusting capacitor 34 so as to reset the light-adjusting capacitor 34, 36 represents a comparator for subjecting voltage realized by the charges stored in the light-adjusting capacitor 34 (that is, collector voltage of the transistor 33) and the reference voltage of the reference voltage source 37 to a comparison, 40 represents an LED (Light Emitting Diode) serving as an alarm display unit, 39 represents a current limiting resistor for limiting the electric current to be supplied to the LED 40, and 41 represents an X contact which is turned on when the operation of the first blind of the shutter 5 has been completed.

The logarithmic compression circuit composed of the diode 30 and the calculation amplifier 31 generates an output obtained by logarithmically compressing the output current from the photodiode 11 so as to operate the transistor 33. An emitter current of the transistor 33 can be varied by the D/A converter 32.

The microcomputer 17 for the camera includes a serial communication circuit and comprises a serial clock output port SCLK, a serial data input port SIN, a serial data output port SOUT, input ports CCC_IN, PSWPRE, PSW1 and PSW2, and output ports PWLED, STSP_EN, FSTART and DA_OUT. The ports SCLK, SIN and SOUT respectively are, through signal transmitting terminals 42 to 44 disposed in a portion in which the body 1 of the camera and the stroboscope unit 2 are connected to each other, connected to the ports SCLK, SOUT and SIN of a microcomputer 68 for the stroboscope unit 2 (hereinafter abbreviated as a "stroboscope-side microcomputer").

Reference numeral 42 represents a terminal for transmitting a clock signal from the microcomputer 17 to the stroboscope-side microcomputer 68. Reference numeral 43 represents a terminal for transmitting data from the stroboscope-side microcomputer 68 to the microcomputer 17. Reference numeral 44 represents a terminal for transmitting data from the microcomputer 17 for the camera to the stroboscope-side microcomputer 68.

A portion in which the body 1 of the camera and the stroboscope unit 2 are connected, there are disposed a terminal 45 for transmitting an output from an OR gate 38 in the body 1 of the camera to a circuit in the stroboscope unit 2, a terminal 47 for transmitting an output signal from the inside of the stroboscope unit 2 to the input port CCC-IN of the microcomputer 17 for the camera, a terminal 46 for transmitting an output from the X contact 41 in the body 1 of the camera to the circuit in the stroboscope unit 2, and a ground terminal 48 for grounding the body 1 of the camera and the stroboscope unit 2.

Referring to FIG. 1, electric elements in the stroboscope unit 2 will now be described.

Reference numeral 68 represents a stroboscope-side microcomputer for performing serial data communication with the microcomputer 17 for the camera and controlling the circuit in the stroboscope unit 2. Reference numeral 49 represents a battery 49 to be mounted on the inside of the stroboscope unit 2. Reference numeral 50 represents a power switch disposed on the stroboscope unit 2, and 51 represents a DC-DC converter for generating an output, the level of which has been raised from that of the output voltage of the battery 49. Reference numeral 52 represents a counterflow-preventive diode, and 53 represents a main capacitor for storing charges for causing a light emission tube (a xenon light emission tube) 14 to be described later. Reference numerals 54 and 55 represent voltage-detecting division resistors for detecting voltage charged in the main capacitor 53. Reference numeral 57 represents a comparator for subjecting the charged voltage detected by the voltage-detecting division resistors 54 and 55 and the voltage of a reference voltage source 56 to a comparison. Reference numeral 59 represents an LED which is turned on by the output from the comparator 57 to display completion of charging. Reference numeral 58 represents a resistor for limiting an electric current in the LED 59. Reference numeral 14 represents the light emission tube comprising a xenon tube or the like, and 60 represents a trigger circuit for causing the light emission tube 14 to start emitting light. Reference numeral 61 represents a light-emission interruption circuit for interrupting light emission of the light emission tube 14. Reference numeral 63 represents a capacitor, in parallel, connected to a calculation amplifier 62 and forming an integral circuit together with the calculation amplifier 62. Reference numeral 64 represents an analog switch for short-circuiting the capacitor 63 when switched on in response to the output signal from the stroboscope-side microcomputer 68 to reset the integration circuit. Reference numeral 16 represents the photodiode (connected to an input terminal of the calculation amplifier 62) for detecting the quantity of light emitted from the light emission tube 14. Reference numeral 65 represents an A/D converter which A/D-converts the output from the integration circuit composed of the calculation amplifier 62 and the capacitor 63 so as to supply the converted value to the stroboscope-side microcomputer 68. Reference numeral 67 represents a D/A converter 67 for D/A-converting an output signal from the stroboscope-side microcomputer 68. Reference numeral 66 represents a comparator which subjects an output from the integration circuit and an output from the D/A converter 67 to a comparison so as to supply a result of the comparison to the stroboscope-side microcomputer 68.

The logic circuit comprising an OR gate 69, AND gates 70 and 71 and an inverter 76 forms a light-emission interruption control circuit having a function for controlling the light-emission interruption circuit 61 in accordance with the output signal from the stroboscope-side microcomputer 68, the output signal from the comparator 66 and an output from the OR gate 38 in the body 1 of the camera.

Reference numeral 75 represents a one-shot circuit for transmitting one-shot pulses, 72 represents an OR gate, 73 and 74 represent AND gates, and 77 to 79 represent inverters. The foregoing elements are controlled in accordance with the output signal from the stroboscope-side microcomputer 68, an output from the OR gate 38 in the body 1 of the camera and an output from the X contact 41 and arranged to control the trigger circuit 60.

The stroboscope-side microcomputer 68 has input/output ports SCLK, SOUT and SIN for performing serial data communication with the microcomputer 17 for the camera and comprises the following ports for controlling the circuit in the stroboscope unit 2.

That is, FR__START is a port for transmitting a signal for switching on or off the analog switch 64, ADIN is an input signal portion for receiving the output from the A/D converter 65, FRCOMP is a port for receiving an output signal from the comparator 66, DAF__OUT is an output port for transmitting a signal to be supplied to the D/A converter 67, MEMO__OUT is an output port for supplying an input to each of the inverter 76 and the AND gate 70, and PRE__OUT is an output port for supplying an input signal to each of the inverter 79 and the AND gate 74.

Figures 2, 2A:
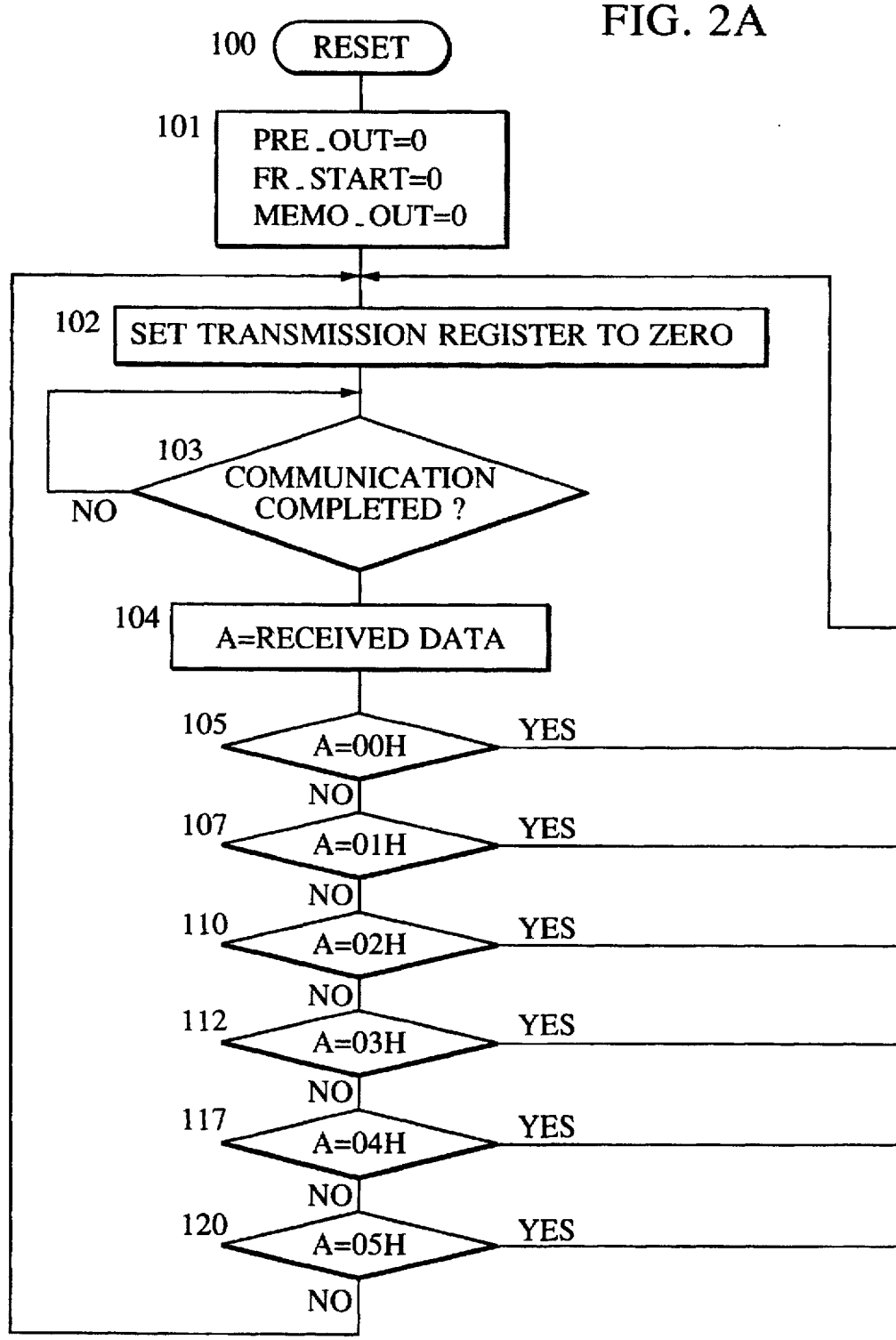
FIG. 2 consisting of FIGS. 2A, 2B, and, 2C, is a flow chart showing the function and a control operation of a microcomputer 68 (stroboscope-side microcomputer) included in the stroboscope unit 2 shown in FIG. 1.
Figure 2B:
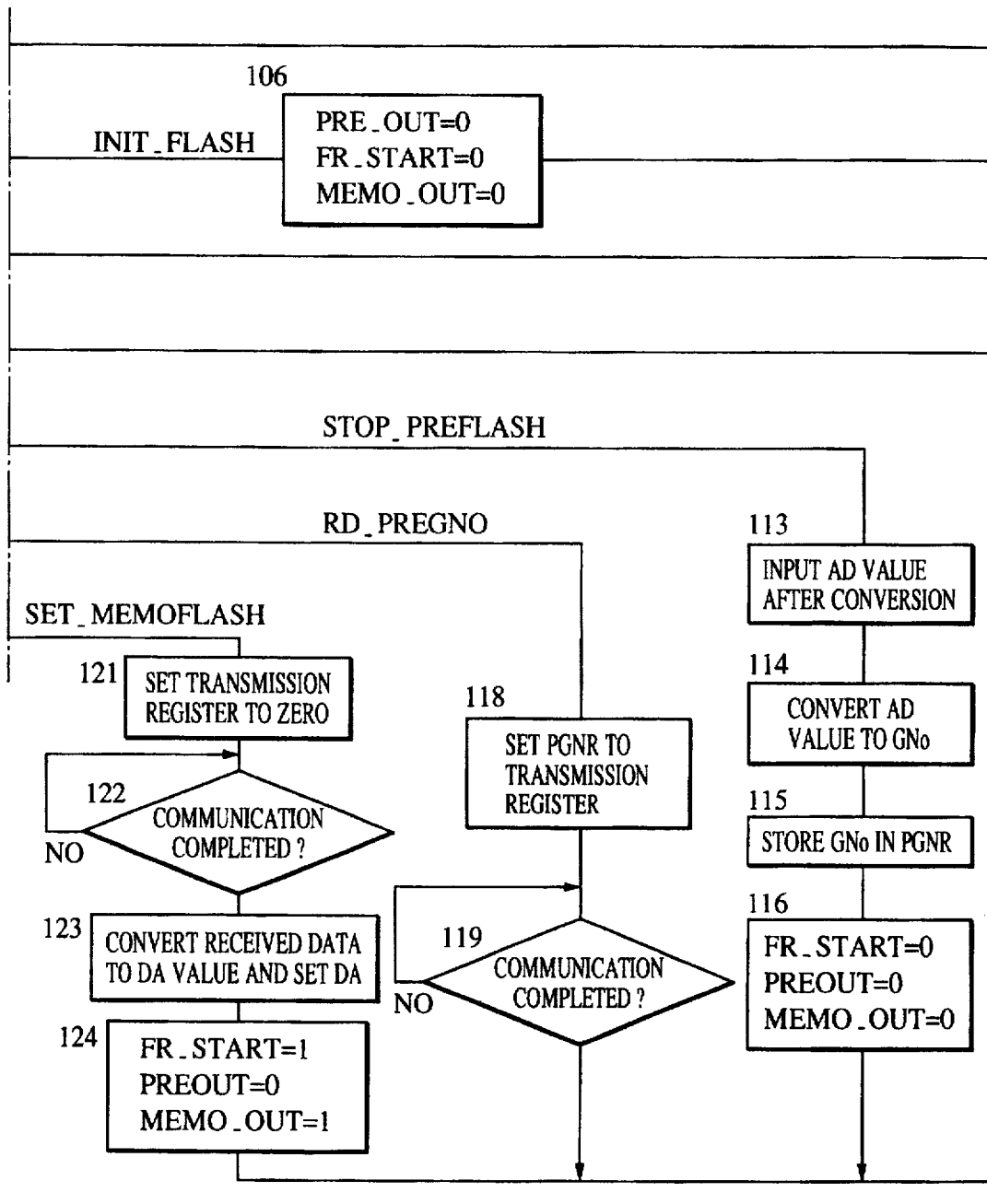
Figure 2C:
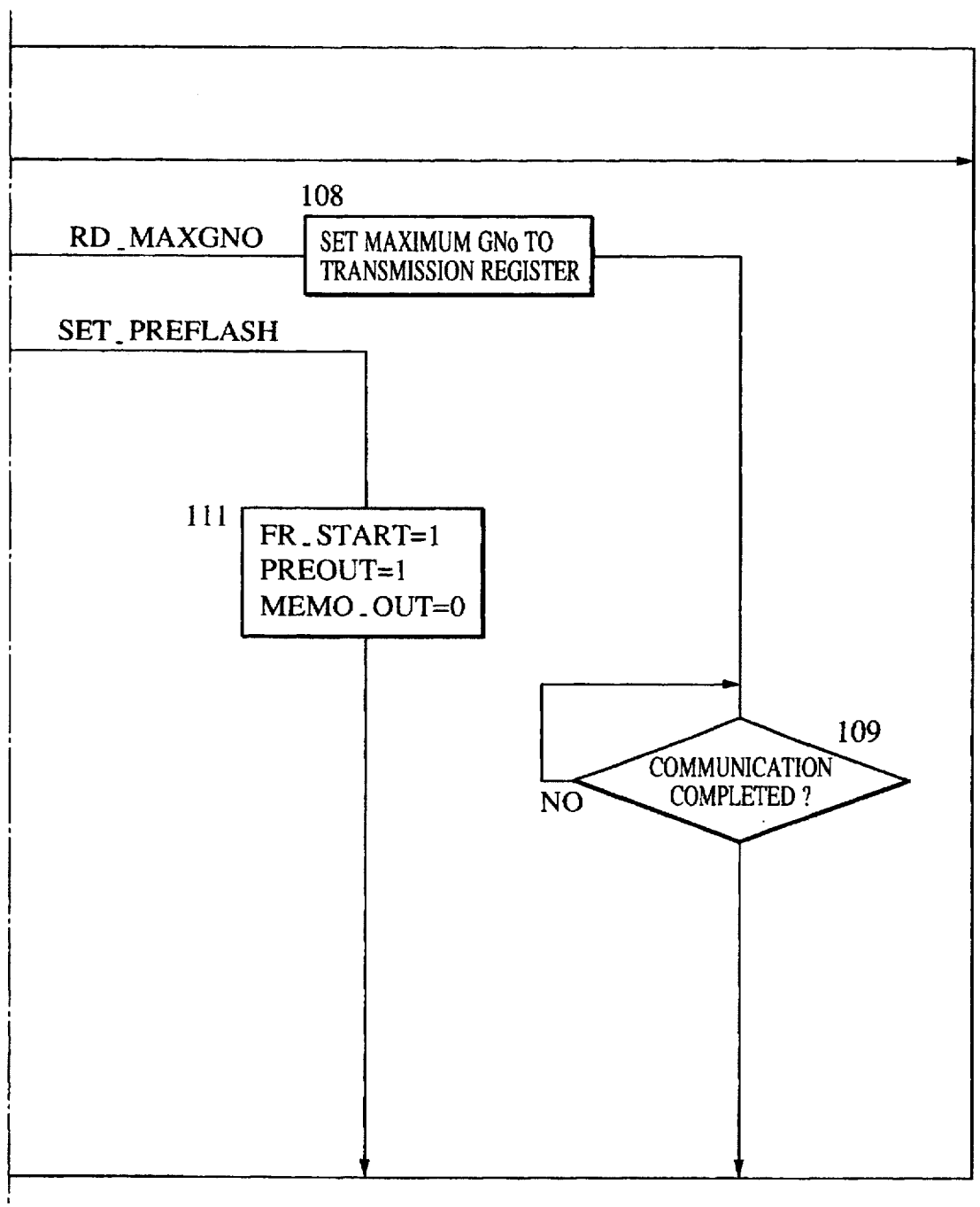
Figure 3B:
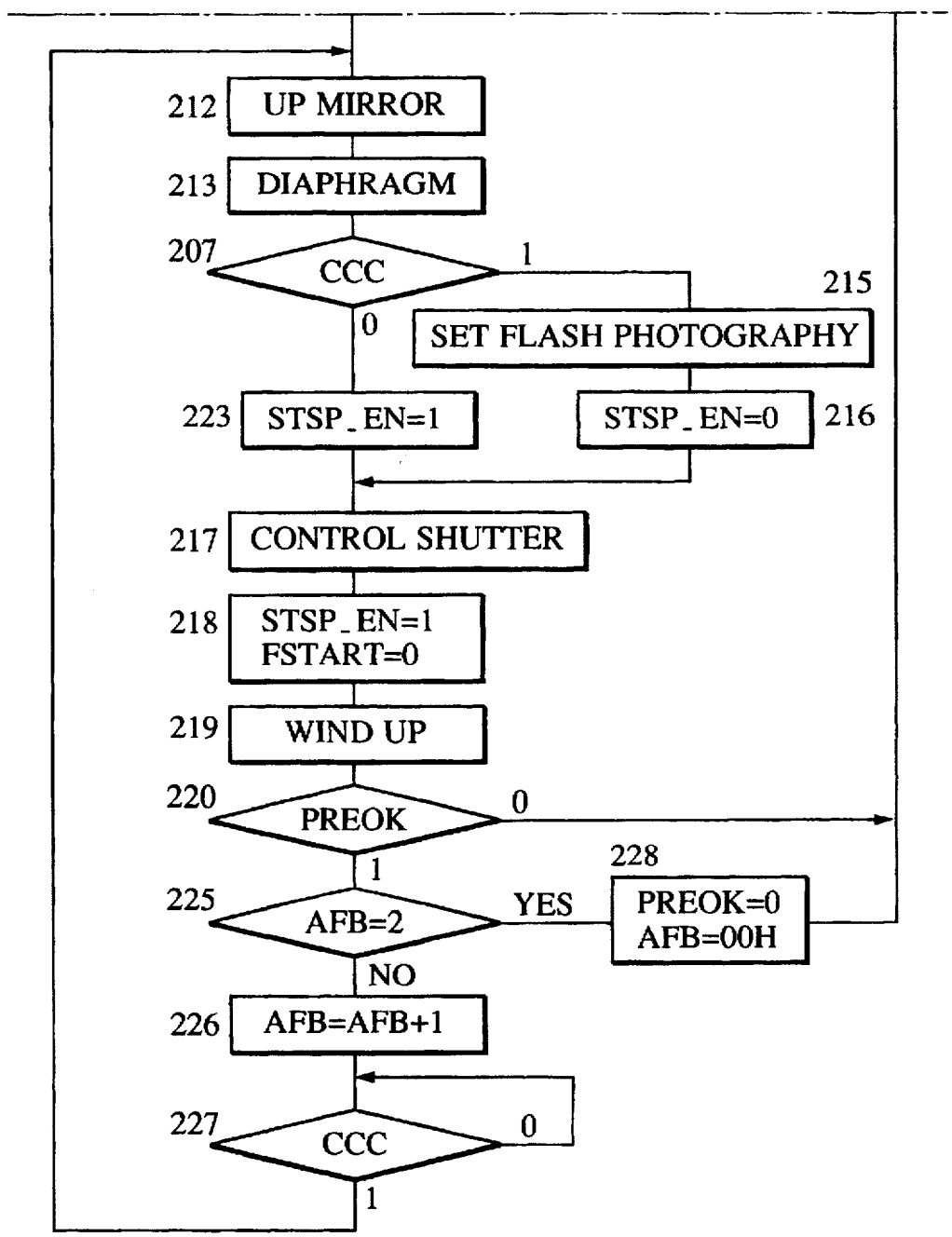
FIG. 3 consisting of FIGS. 3A and 3B, is a main flow chart showing the function and a control operation of a microcomputer 17 for the camera included in the body 1 of the camera shown in FIG. 1.

FIG. 2 is a flow chart showing the operation of the stroboscope-side microcomputer 68. FIG. 3 is a flow chart showing the operation of the microcomputer 17 for the camera.

Referring to FIGS. 1 and 2, the operation of the stroboscope-side microcomputer 68 will now be described.

When the power switch 50 is switched on, the battery 49 is connected to the DC-DC converter 51 so that electric energy is supplied to the strobe circuit. Also the stroboscope-side microcomputer 68 is supplied with electric energy from a power supply circuit (not shown). As a result, the stroboscope-side microcomputer 68 starts operating in step (100) shown in FIG. 2.

(101): 0 is transmitted to the ports PRE__OUT, port FR__START and port MEMO__OUT.

When 0 is transmitted to the port FR__START, the analog switch 64 is switched on so that the two ends of the capacitor 63 are short-circuited so that the charges stored in the capacitor 63 are made to be zero.

When 0 is transmitted to each of the ports PRE__OUT, and MEMO__OUT, the stroboscope-side microcomputer 68 is initialized. The thus-realized state is called a "normal light emission mode" of the stroboscope unit.

(102): 0 is set to the transmission register.

(103): Communication from the microcomputer 17 for the camera is waited for. In a case where the microcomputer 17 for the camera intends to transfer data by one megabyte, data intended to be transmitted is stored in the transmission register and turns on the serial communication circuit in the microcomputer 17 for the camera. Thus, the serial communication circuit synchronizes with an 8-clock signal transmitted from the terminal 42 to transmit data in the transmission register by each one bit to the output port SOUT. At this time, the serial communication circuit in the stroboscope-side microcomputer 68, through the port SIN, receives data from the microcomputer 17 for the camera into a receiving register through the serial data terminal 44 in synchronization with a serial clock transmitted through the serial clock terminal 42. Simultaneously, the stroboscope-side microcomputer 68 transmit data in the inside transmission register in synchronization with the serial clock of the microcomputer 17 for the camera. The microcomputer 17 for the camera, through the port SIN, receives the data through the terminal 43. Whenever one serial communication operation is performed, 8-bit data items in the respective two transmission registers are transferred to the two receiving registers, that is, data items are mutually changed.

(104): Data received from the microcomputer 17 for the camera is transferred to a register A.

(105): When the register A is equal to 00H, the operation is branched to step (106).

(106): A command for initializing the stroboscope-side microcomputer 68. Similarly to step (101), the ports are initialized, and then the stroboscope-side microcomputer 68 is set to the "normal light emission mode" and then the operation returns to step (102).

(107): When the register A is equal to 01H, the operation is branched to step (108).

(108): A command of the stroboscope-side microcomputer 68 for a maximum guide number. The maximum guide number is set to the transmission register. An assumption is made here for performing explanation that the maximum guide number is 32. Since the code of the guide number 32 is 30H in the following Table 1, 30H is set to the transmission register.

TABLE 1

| Guide Numbers | Sexadecimal Codes |
|---|---|
| 32 | 30H |
| 22 | 2CH |
| 16 | 28H |
| 11 | 24H |
| 8 | 20H |
| 6 | 1CH |
| 4 | 18H |
| 3 | 14H |
| 2 | 10H |

(109): Serial communication is waited for. After data has been transferred to the microcomputer 17 for the camera, the operation is returned to step (102).

(110): If the register A is equal to 02H, then the operation is branched to step (111).

(111): A command of the stroboscope-side microcomputer 68 for performing preparation for previous light emission. Transmission of 1 to the port FR_START is performed, the analog switch is switched off, and the capacitor 63 is brought to a state where it is able to perform integration. Transmission of 1 to the port PRE_OUT is performed and 0 is transmitted to the port MEMO_OUT so that the state of the stroboscope-side microcomputer 68 is switched to a pre-light-emission mode. Immediately after switching, the operation is returned to step (102).

(112): If the register A is equal to 03H, then the operation is branched to step (113).

(113): A requirement command of the capacitor 63 for completion of the pre-light-emission. Electric currents of the photodiode 16 corresponding to the quantity of light emitted as the pre-light-emission are charged in the integrating capacitor 63. Since the voltage of the capacitor 63 appears in the output from the calculation amplifier 62, the output is received through the A/D converter 65.

(114): The voltage value obtained after the A/D conversion is converted into a guide number. If light is emitted in the pre-light-emission in a quantity corresponding to, for example, guide number 16, then the guide number 16, 28H is given.

(115): The guide number is stored in the register PGNR.

(116): Transmission of 0 to the port FR_START is performed, the analog switch is switched on and charges stored in the capacitor 63 are cleared. Moreover, 0 is transmitted to the port PRE_OUT and 0 is transmitted to the port MEMO_OUT. The state of the stroboscope unit is returned to the normal light emission mode, and then the operation is returned to step (102).

(117): If the register A is equal to 04H, then the operation is branched to step (118).

(118): A requirement command of the stroboscope-side microcomputer 68 for transmission of the pre-light-emission guide number. The value of the register PRNR storing the pre-light-emission guide number is set to the transmission register.

(119): Serial communication is waited for. After data has been transferred to the microcomputer 17 for the camera, the operation is returned to step (102).

(120): If the register A is equal to 05H, then the operation is branched to step (121). Since other data is a result of erroneous transmission, the operation is returned to step (102).

(121): A requirement command of the stroboscope-side microcomputer 68 for performing preparation for light emission corresponding to the set guide number.

(122): Transmission of data from the microcomputer 17 for the camera is waited for. If data has been transmitted, then the operation proceeds to step (123).

(123): The received guide number is converted into a voltage value which is set to the D/A converter 67.

(124): Transmission of 1 to the port FR_START is performed, the analog switch is switched off, and the capacitor 63 is brought into a state where it is able to perform integration. Moreover, 0 is transmitted to the PRE_OUT, 1 is transmitted to the port MEMO_OUT, and the state of the stroboscope unit is switched to a guide number light emission mode. Then, the operation is returned to step (102).

The stroboscope-side microcomputer 68 performs as described above and operates in accordance with the commands communicated from the microcomputer 17 for the camera.

Referring to a flow chart, which is shown in FIG. 3, and FIG. 1, the operation of the microcomputer 17 for the camera will now be described.

When a power switch (not shown) of the body 1 of the camera has been switched on, the microcomputer 17 for the camera in the reset state (200) starts operating. Initially, the normal flashing photographing operation will now be described.

(201): Transmission of 1 to the port STSP_EN results in 1 being transmitted to the terminal 45 for a signal for starting or stopping light emission. Transmission of 0 to the port FSTART is performed, and then the analog switch 35 is switched on. Flag PREOK is turned off, and 00H is stored in a register AFB. 0 is transmitted to the port PWLED to turn the alarming LED off.

(202): 00H is set to the transmission register in the microcomputer 17 for the camera.

(203): Serial communication with the stroboscope-side microcomputer 68 is performed in a quantity of one byte. As a result, the stroboscope-side microcomputer 68 is set to the "normal light emission mode".

(204): The state of the port PSW1 is determined. If the SW1 has been switched on, the operation proceeds to step (206). If the SW1 has been switched off, the operation proceeds to step (205).

(205): The state of the port PSWPRE is determined. If the port SWPRE has been turned on, the operation proceeds to step (206). If it has been switched off, the operation is returned to step (204). If the switch SW1 has been switched off and the port SWPRE has been turned off, steps (204) and (205) are repeated. Therefore, the operation circulates in the foregoing loop to wait for the camera being operated. When a person who performs the photographing operation causes the body 1 of the camera to face the main object and depresses the release button for the first stroke, the switch SW1 is switched on. After the switch SW1 has been switched on, the operation proceeds to step (206).

(206): The photometric circuit 18 is turned on to perform photometry of the brightness of the object and convert the measured value into an EV value.

(207): If the state of the port CCC_IN is high, the operation is branched to step (208). The port CCC_IN detects the state of charge of the main capacitor 53 of the stroboscope unit through the terminal 47 for the signal indicating completion of charging. After the power switch 50 has been switched on, the battery 49 is connected to the DC-DC converter 51 so that the DC-DC converter 51 generates voltage required to emit flash light. The voltage of the DC-DC converter 51 is charged into the main capacitor 53 through the counterflow-preventive diode 52. Since no charge is charged into the main capacitor 53 immediately after the power switch 50 has been switched on, the voltages divided by the voltage-detecting division resistors 54 and 55 are lower than the voltage of the reference voltage source 56. Therefore, the level of the output from the comparator 57 for detecting the completion of charging is low and, therefore, the LED 59 for displaying the completion of charging has been turned off. As the time elapses, the DC-DC converter 51 continues charging of electric power to the main capacitor 53 so that the voltage of the main capacitor 53 is raised to a level which is sufficiently high to emit flash light. Since the resistance values of the voltage-detecting division resistors 54 and 55 and the voltage value of the reference voltage source 56 for detecting the completion of charging are set in such a manner that the voltages divided by the voltage-detecting division resistors 54 and 55 are higher than the reference voltage source 56 for detecting the completion of charging, the output from the comparator 57 for detecting the completion of charging is inverted to a high level. Therefore, an electric current flows into the LED 59 for displaying the completion of charging so that the LED 59 for displaying the completion of charging is turned on. A case where charging has been completed and, therefore, the level of the terminal 47 for the signal indicating the completion of charging has been raised will initially be described with reference to the following flow chart.

(208): Calculation of EF (determination of quantity of exposure for performing the strobe photographing operation). The value of the photometry obtained in step (206) is used to calculate an aperture value and duration of time for the shutter. For example, if the duration of time for the shutter is determined to be a tuning duration of time and the aperture is determined to be F4, the strobe photographing operation can be performed even if surrounding light is dark. A flash light photographing program graph in which the duration of time for the shutter and the aperture value are changed in accordance with the brightness of external light may be employed.

(209): The state of switch SWPRE is determined. If it has been switched off, the operation proceeds to step (210).

(210): The aperture value and duration of time for the shutter calculated in step (208) are displayed.

(211): The state of switch SW2 is determined. If it has been switched off, the operations in steps (204) to (210) are repeated. During a period in which the switch SW1 is switched on, the brightness of the object is measured so that an appropriate aperture value and the duration time for the shutter are sequentially measured, calculated and displayed. When the person who intends to perform the photographing operation further depresses the release button to perform exposure to switch on the switch SW2, the operation proceeds from step (211) to step (212).

(212): The mirror operating circuit 20 is operated so that the mirror 8 is moved upwards so that a state where the photographing operation can be performed is realized.

(213): The diaphragm is operated to the aperture value calculated in step (208).

(214): The state of the terminal 47 for the signal indicating the completion of charging is determined. Since the main capacitor 53 has been charged completely and the level of the terminal 47 for the signal indicating the completion of charging is high, the operation proceeds to step (215).

(215): A sub-routine for setting the flash light photographing operation is called (a flow chart of the sub-routine for setting the flash light photographing operation is shown in FIG. 4).

Figure 4:
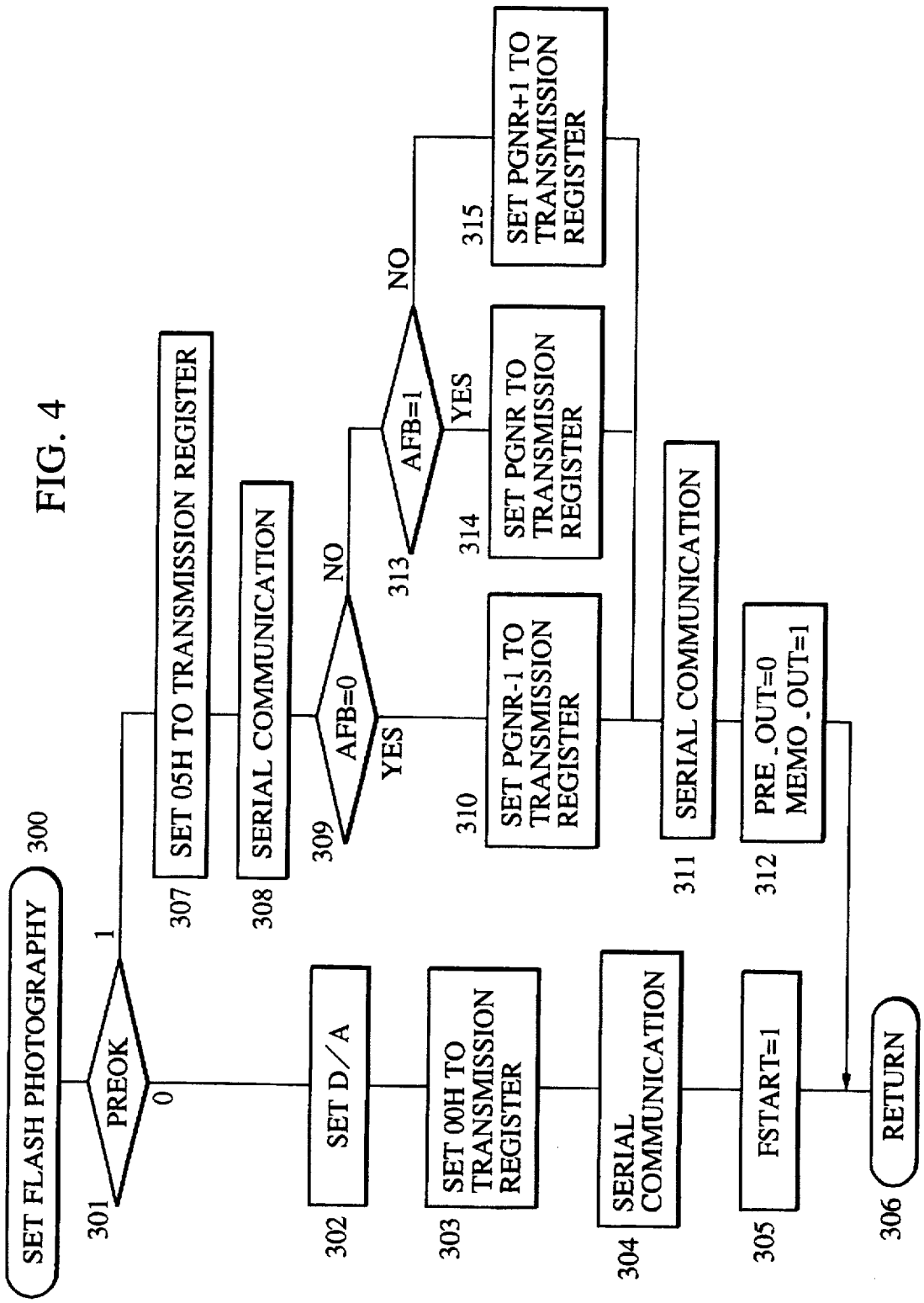
FIG. 4 is a flow chart of a sub-routine of the contents of step 215 of the flow chart shown in FIG. 3.

When the sub-routine for setting the flash light photographing operation has been called, the operation proceeds to an operation for setting the flash light photographing operation step (300) shown in FIG. 4.

(301): Since the flag PREOK has been turned off in step (201), the operation proceeds to step (302).

(302): A threshold of the D/A converter 32 is set. A threshold corresponding to the ISO sensitivity of the film 4 set by an ISO setting member (not shown) is set to the D/A converter 32. The set value will be described in detail in step (217).

(303): 00H is set to the transmission register.

(304): Data is serial-communicated by one byte. The stroboscope-side microcomputer 68 receives communicated data to set the stroboscope unit to the normal light emission mode.

(305): Transmission of 1 to FSTART is performed, and the analog switch 35 is switched off. Since the analog switch 35 has been switched off, the capacitor 34 for integrating the quantity of adjustment of light has been in a discharged state. Therefore, a negative input of the comparator 36 is the same as the power supply voltage which is higher than that of the reference voltage source 37, the comparator 36 transmits a low level signal.

(306): The operation is returned to step (216) in the main routine (see the flow chart shown in FIG. 3).

(216): The level of the port STSP_EN is lowered. Since the output from the comparator 36 is low, a low level signal is transmitted to the terminal 45 for the signal for starting or stopping light emission.

(217): The shutter is controlled in such a manner that the first blind of the shutter 5 is moved previously and the film is exposed to light for the time calculated in step (208).

After the previous movement of the shutter 5 has been completed, the X contact 41 is turned on.

Since the port PREOUT of the stroboscope-side microcomputer 68 is set to a low level in step (304) in the stroboscope unit, the level of the output from the inverter 79 is high and the level of the terminal 45 for the signal for starting or stopping light emission is low. Therefore, also the output from the inverter 77 is high. When the X contact 41 has been turned on and the level of the terminal 46 for a signal for turning the X contact 41 has been lowered, the level of the output from the inverter 78 is switched to a high level. Thus, the level of the output from the AND gate 73 is switched to a high level and the level of the OR gate 72 is switched to a high level. Therefore, the one-shot circuit 75 transmits high level signals for a predetermined time so that the trigger circuit 60 is turned on to cause the light emission tube 14 for emitting flash light to start light emission. Flash light emitted by the light emission tube 14 illuminates the object, causing reflected light to be applied to the surface of the film 4 through the photographing lens. Thus, the photodiode 11 measures reflected light on the surface of the film 4 so as to generate an electric current corresponding to the intensity of light.

Output $V_{op}$ from the calculation amplifier 31 of the logarithmic compression circuit is expressed by Equation (1) if a photoelectric current generated in the photodiode 11 for adjusting flash light is $I_{spc}$:

$$V_{op} = \frac{kT}{q} \log \frac{I_{spc}}{I_s} + V_C \quad (1)$$

where q: charge of electron k: Boltzmann's constant

T: absolute temperature $I_s$: collector saturated electric current of the transistor $V_c$: reference voltage of the anode of the photodiode 11 for adjusting flash light Assuming that the output voltage of the DA converter is $V_{DA}$, electric current $I_{CE}$ flowing in the transistor 33 is as follows:

$$I_{CE} = I_s e^{\frac{q}{kT}(V_{op}-V_{DA})} \quad (2)$$

In accordance with Equations (1) and (2), the following equation is obtained:

$$\begin{aligned}
I_{CE} &= I_s e^{\log \frac{I_{PC}}{I_s} \times \frac{q}{kT}(V_C-V_{DA})} \\
&= I_{spc} \times 2^{\log 2 \cdot \frac{q}{kT}(V_C-V_{DA})} \\
&= I_{spc} \times 2^{\frac{1}{0.018}(V_C-V_{DA})}
\end{aligned}$$

Therefore, if the output from the D/A converter 32 is lowered than N times 18 mV by $V_C$, then the charging electric current is n-th power of 2.

The collector voltage $V_{col}$ of the transistor 33 after t seconds have been passed from a moment at which the analog switch 35 has been switched off is expressed by the following Equation (3):

$$V_{COL} = V_{CC} \frac{1}{C} \int_0^1 I_{CE} D dl \quad (3)$$

where

C: capacity of the capacitor 34 for integrating the quantity of adjustment of light $V_{CC}$: power supply voltage As the time passes, the collector voltage $V_{col}$ of the transistor 33 is lowered. When the collector voltage $V_{col}$ has been lowered to a level lower than the output voltage from the reference voltage source 37, the level of the output from the comparator 36 is inverted from a low level to a high level. The signal from the comparator 36 passes through the OR gate 38 and the terminal 45 for the signal for starting or stopping light emission, followed by being supplied to the AND gate 71. Since the level of the output from the port MEMO_OUT is low, the output from the inverter 76 has been raised. Therefore, also the level of the output from the AND gate 71 is inverted to a high level, the output being then allowed to pass through the OR gate 69. Thus, the light-emission interruption circuit 61 is operated so that the light emission from the xenon tube 14 for emitting flash light is interrupted.

When the output from the transistor 33 is set to $V_C$ volts and the capacity of the capacitor 34 for integrating the quantity of adjusted light and the voltage of the reference voltage source 37 are set in such a manner that the output from the comparator 36 is inverted when the surface of the film 4 is irradiated with light of 0.1 lux·sec, flash light can be emitted to an ISO100 film in an appropriate quantity. In a case where the output from the D/A converter 32 is set to, for example, $V_C$+19 mV, emission of flash light is interrupted when the surface of the film is irradiated with light of 0.2 lux·sec. The foregoing light corresponds to an appropriate quantity of light for the ISO50 film.

In a case where the output from the D/A converter 32 is set to $V_C$−19 mV, emission of flash light is interrupted when the surface of the film is irradiated with light of 0.05 lux·sec. The foregoing quantity of light corresponds to an appropriate quantity of light for the ISO200 film.

Thus, quantity of exposing light corresponding to the ISO sensitivity of the film and required to perform the strobe photographing operation can be given.

(208): After the film has been exposed to light for the time calculated in step (208), the second blind of the shutter 5 is moved, and then the operation proceeds to step (218).

(218): The level of the flash light emission signal is raised when the port STSP_EN=1. If the film is irradiated with light in an appropriate quantity, the high level of the output from the OR gate 38 is maintained. In a case where the film is not irradiated with light in an appropriate quantity due to a fact that the distance from the object is too long even if the stroboscope unit fully emits light, the level is switched to a high level.

By making the port FSTART=0, charges stored in the capacitor 34 for integrating the quantity of adjusted light are discharged.

(219): The film feeding control circuit 23 is turned on to wind one frame of the film 4, and the shutter 5 is charged.

(220): Flag PREOK is checked. Since it is 0 in step (201), the operation is returned to step (204).

Thus, the normal flash photographing operation can be performed.

The operation of the microcomputer 17 for the camera to be performed in a case of an AE photographing operation (an automatic exposure control photographing operation in such a manner that the stroboscope unit is not used) will now be described.

If a photographer does not mount the stroboscope unit 2 or the same does not switch on the power switch 50 of the stroboscope unit 2, the level of the terminal 47 for the charge completion signal is lowered.

If the photographer depresses the release button and switches the switch SW1 on in the foregoing case, photometry is performed in step (206), and then the operation proceeds from step (207) to step (221).

(221): 0 is transmitted to PWLED so that the alarming LED is turned off. No alarm is issued when the AE photographing operation is performed.

(222): The AE calculations are performed such that the aperture value and the duration of time for the shutter are calculated in accordance with the photometry value.

(210): The calculated aperture value and the duration of time for the shutter are displayed.

(211): If the switch SW2 has not been switched on, the operations in steps (206) to (210) are repeated so that photometry, calculations and display are repeated. If the switch SW2 is switched on, the upward movement of the mirror is performed in step (212), and then stopping is performed in step (213). Then, the operation proceeds from step (214) to step (223).

(223): Port STSP_EN is set to be 1. Although it has been set in step (201), it is again set here. Thus, the high level of the terminal 45 for the signal for starting or stopping light emission is maintained.

(217): The shutter is operated. The film is exposed to light for the duration of time for the shutter calculated in step (222). Since the level of the terminal 45 for the signal for starting or stopping light emission is high though the X contact 41 has been turned on, the level of the output from the AND gate 73 is maintained at the low level. Therefore, the stroboscope unit 2 does not emit light. Then, the film is wound, and then the operation proceeds to step (204).

Thus, the photographing operation in such a manner that the stroboscope unit is not used can be performed.

The operation of the microcomputer 17 for the camera to be performed in a case of a flash bracket photographing operation will now be described which is an important function of the camera according to the present invention.

When the photographer switches on the pre-light emission switch SW_PRE in a case where the main capacitor 53 has been charged completely, the operation proceeds from step (205) to step (206).

(206): The photometry is performed, and then the operation proceeds from step (207) to step (208) so that the EF calculation is performed.

Figure 5A:
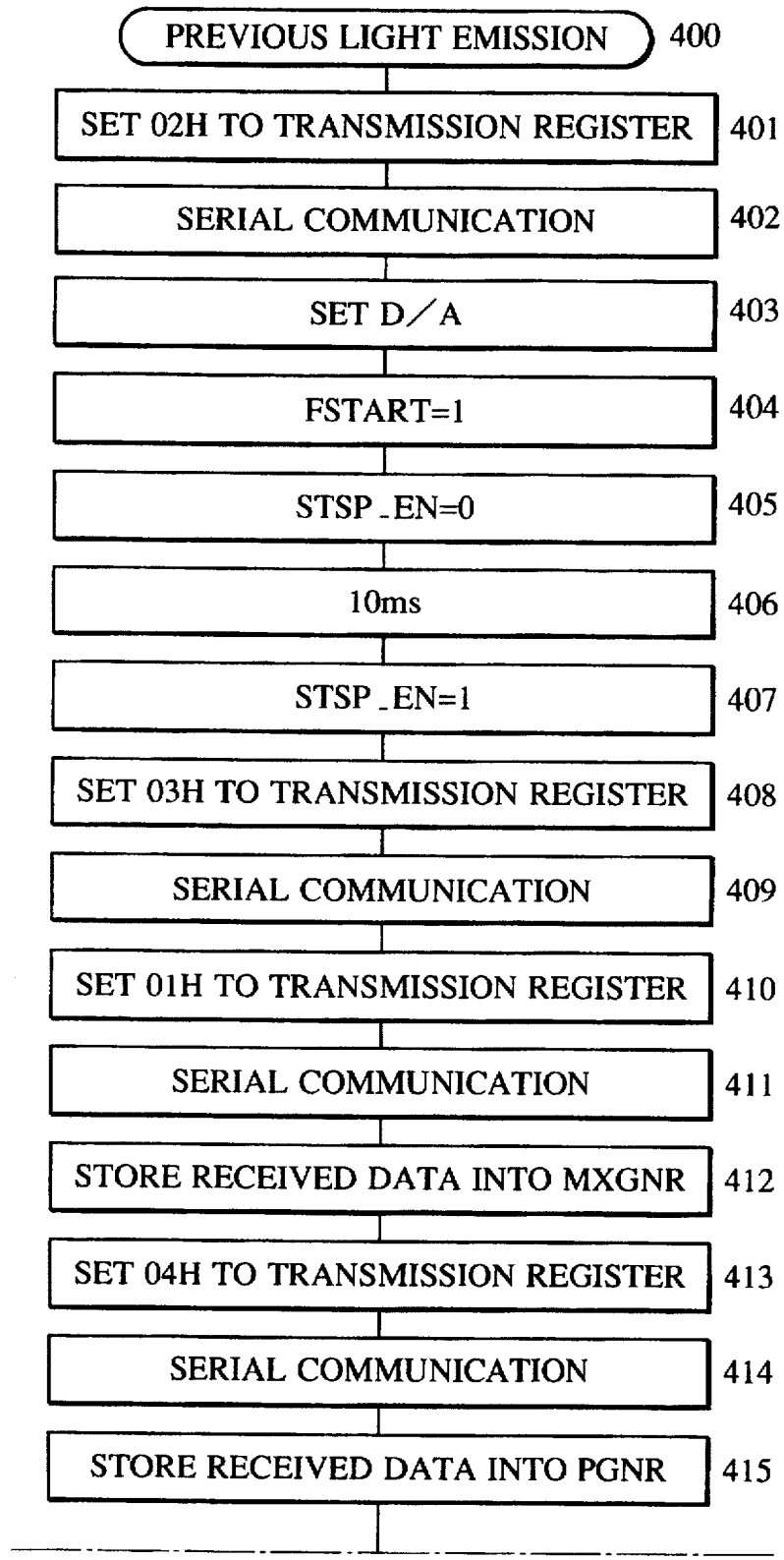
FIG. 5 consisting of FIGS. 5A and 5B, is a flow chart of a sub-routine of the contents of step 224 shown in FIG. 3.
Figures 5, 5B:
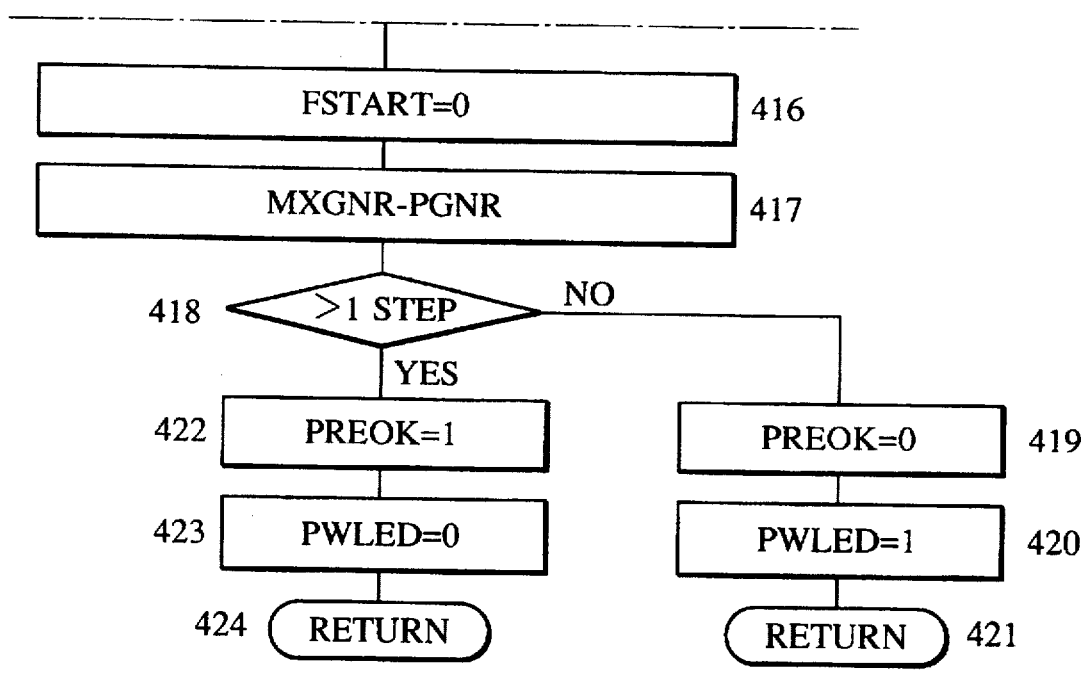

(209): Since SWPRE has been switched on, the operation proceeds to step (224) so that the pre-light-emission sub-routine is called. A flow chart of the pre-light-emission sub-routine is shown in FIG. 5. After the pre-light-emission sub-routine has been called, the operation proceeds to step (400) shown in FIG. 5.

(401): 02H is set to the transmission register.

(402): 02H is transmitted to the stroboscope-side microcomputer 68. When the stroboscope-side microcomputer 68 has received 02H, the port PRE_OUT=1 and the port MEMO_OUT=0 so that the current limiting resistor 58 sets the circuit to the pre-light-emission mode. When the port FR_START is 1, the analog switch 64 is switched off.

(403): The threshold of the D/A converter 32 is set. A value corresponding to the ISO, which is the sensitivity of the film, is set to the D/A converter 32. Although the ISO100 has been set to $V_C$ due to the reflection of the film, the photodiode 11, in the pre-light-emission mode, receives light reflected by the sub-mirror 9 in place of the light reflected by the surface of the film. The difference must be corrected. The diaphragm is opened in the pre-light-emission mode and the same is stopped to the value calculated in step (208). Therefore, also the difference corresponding to the stopping steps must be corrected. Assuming that the quantity of light made incident upon the light adjusting sensor 11 in the pre-light-emission mode is, for example, four times the quantity of light reflected by the surface of the film in the actual photographing operation, the value is set to be $V_C+36$ mV. Thus, even if the light passage or the aperture value is different in the pre-light-emission mode, flash light is controlled to have an appropriate quantity on the surface of the film.

(404): Port FSTART is set to 1 so that the analog switch 35 is switched off. Thus, integration of the quantity of irradiation light is started.

(405): Port STS_EN=0 is transmitted so that the level of the terminal 45 for the signal for starting or stopping light emission is lowered.

Since the stroboscope-side microcomputer 68 has been brought into the pre-light-emission mode, the level of the AND gate 74 is raised when PRE_OUT is 1 and the level of the terminal 45 for the signal for starting or stopping light emission is low. Thus, the trigger circuit 60 is operated through the OR gate 72 so that the light emission xenon tube 14 emits light.

Emitted flash light illuminates the object. Reflected light passes through the photographing lens 3 and the main mirror 8, and then made incident upon the sub-mirror 9. The photodiode 11 for adjusting the quantity of light measures the intensity of reflected light so as to generate an electric current corresponding to the intensity of light. If flash light has been emitted in an appropriate quantity, the level of the comparator 36 is inverted to a high level so as to raise the level of the terminal 45 for the signal for starting or stopping light emission to a high level. Thus, the levels of the AND gate 71 and the OR gate 69 are raised. As a result, the light-emission interruption circuit 61 is operated so that the light emission of the light emission xenon tube 14 is interrupted.

When the photodiode 16 for measuring the quantity of emitted flash light of the stroboscope unit 2 has generated an electric current corresponding to the quantity of flash light, the charges of the generated electric currents charge the integrating capacitor 63. Therefore, the output from the calculation amplifier 62 is made to be a value in proportion to the quantity of the charge in the integrating capacitor 63. Assuming that setting is performed such that the output from the calculation amplifier 62 is 2 V when the stroboscope unit fully emits light with the guide number 32, light emission with the guide number 16 results in the output from the calculation amplifier 62 being 1 V. When the guide number is 8, the output is 0.5 V.

(406): Waiting for sufficiently long time (10 ms) for the stroboscope unit to emit light is performed.

(407): Set port STSP_EN to be 1, and the level of the terminal 45 for the signal for starting or stopping light emission is returned to the high level.

(408): 03H is set to the transmission register.

(409): Serial communication with the stroboscope-side microcomputer 68 is performed. The stroboscope-side microcomputer 68 receives command 03H from the microcomputer 17 for the camera to A/D-convert the output from the calculation amplifier 62. The stroboscope-side microcomputer 68 converts the voltage of the capacitor 63, which has been A/D-converted, into a guide number stored in register PGNR. Then, the mode is returned to the normal light emission mode.

(410): 01H is set to the transmission register.

(411): Serial communication with the stroboscope-side microcomputer 68 is performed.

(412): The maximum light emission guide number is read from the stroboscope-side microcomputer 68 so as to store it in the register MXGNR.

(413): 04H is set to the transmission register.

(414): Serial communication with the stroboscope-side microcomputer 68 is performed.

(415): A pre-light-emission guide number is read from the stroboscope-side microcomputer 68 so as to be stored in the register PGNR.

(416): Set the port FSTART to be zero. The charges stored in the capacitor 34 for integrating the quantity of adjusted light are discharged.

(417): MXGNR—PGNR is calculated.

(418): If MXGNR—PGNR is smaller than one step, the quantity of flash light is insufficient to perform the bracket exposure with a step higher by one step. Therefore, the operation proceeds to step (419).

(419): 0 is set to flag PREOK.

(420): 1 is transmitted to PWLED so that the alarming LED is turned on. That is, a fact that the flash light bracket photographing operation cannot be performed is alarmed.

(421): The operation is returned to step (210) in the main flow.

If the switch SW2 is switched on afterwards, the foregoing normal flash light photographing operation is performed.

If MXGNR is larger by one or more steps in step (418), the one-step-higher bracket photographing operation (stepped exposure) can be performed. Therefore, the operation proceeds to step (422).

(422): 1 is set to flag PREOK which is a flag for recording a fact that the pre-light-emission has been succeeded.

(423): 0 is transmitted to port PWLED. The alarm display is not turned on.

(424): The operation is returned to the main flow.

As described above, the pre-light-emission is performed so that the quantity of light emitted by the stroboscope unit can be obtained as the guide number. Note that this embodiment has the structure such that the quantity of light in the pre-light-emission is emitted in an appropriate quantity, light may be measured with a smaller quantity, for example, quantity of light of 1/16 and the obtained guide number is multiplied by 16 to obtain an appropriate quantity.

In the case where the operation is returned from step (421) in the pre-light-emission routine to step (210) in the main routine, display is performed in step (210). In step (211) the second stroke switch SW2 of the release button is determined.

When the switch SW2 has been switched on for the purpose of performing the photographing operation, the operation proceeds to step (212). In step (212) the mirror is moved upwards, and the diaphragm is stopped in step (213). In step (214) the operation is branched to step (215) so that the sub-routine for setting the flash light photographing operation is called.

In the sub-routine for setting the flash light photographing operation, the following operations are performed.

(301): Since flag PREOK is 1, the operation is branched to step (307).

(307): 05H is set to the transmission register.

(308): Serial communication with the stroboscope-side microcomputer 68 is performed. The stroboscope-side microcomputer 68 is brought into a state where it waits for a next communication.

(309): The value of the register AFB is determined.

(201): Since setting to 0 has been performed in step (201), the operation proceeds to step (301).

(310): PGNR-one step is set to the transmission register.

(311): Serial communication with the stroboscope-side microcomputer 68 is performed.

A value lower, by one step, than the guide number, with which the pre-light-emission has been performed, is transmitted to the stroboscope-side microcomputer 68. The stroboscope-side microcomputer 68 converts received data into a voltage value and sets the voltage value to the D/A converter 67. That is, a value, which is half of the voltage which has been A/D-converted in the pre-light-emission, is transmitted to the D/A converter 67.

(312): Following settings are performed such that PRE—OUT=0 and port MEMO—OUT=1 so that the guide number light emission mode is realized.

(306): The operation is returned to step (216) in the main flow.

After the operation has been returned to the main flow, the following operations are performed.

(216): Port STSP—EN is made to be 0.

(217): The shutter is operated.

After the first blind of the shutter has been moved, the X contact 41 is turned on.

When the level of the terminal 45 for the signal for starting or stopping light emission has been lowered, the levels of the AND gate 73 and the OR gate 72 are raised to high levels similar to the normal flash light photographing operation. Thus, the trigger circuit 60 is operated so that the light emission xenon tube 14 starts emitting light. Since FSTART is 0 as it is in this case, the level of the terminal 45 for the signal for starting or stopping light emission is not raised due to light reflected by the surface of the film. As an alternative to this, the photodiode 16 for measuring the quantity of emitted flash light of the stroboscope unit measures the quantity of light emitted by the xenon tube 14. The charges of the electric currents generated by the photodiode 16 for measuring the quantity of emitted flash light are stored in the integrating capacitor 63. When the output from the calculation amplifier 62 has been made to be the same as the output from the D/A converter 67 for transmitting comparator voltage, the output from the comparator 66 is inverted. Thus, the levels of the AND gate 70 and OR gate 69 are raised to high levels, causing the light-emission interruption circuit 61 to be operated. As a result, light emission of the light emission xenon tube 14 is interrupted. As a result, the stroboscope unit emits light in a quantity corresponding to the guide number set by the microcomputer 17 for the camera in step (310). Since the set guide number is lower than an appropriate value by one step, the film is exposed to light with an under step by one step.

After the film has been wound, the operation proceeds from step (220) to step (225) because flag PREOK is 1.

(225): The value of the register AFB is determined. Since the value is 0, the operation proceeds to step (226).

(226): The value in the register AFB is increased by one.

(227): A moment at which the terminal 47 for the charge completion signal is made to be 1 is waited for. That is, completion of charging of the main capacitor 53 is waited for, and then the operation is returned to step (212).

As described above, release after the pre-light-emission causes the automatic and continuous exposure to be performed. After the mirror has been moved upwards and the diaphragm has been stopped for the second frame, the operation again proceeds to the sub-routine for setting the flash light photographing operation.

Since the register AFB has been made to be 1 in step (226) in the main routine, the operation proceeds from step (313) to step (314) in the sub-routine.

(314): The value of register PGNR is set to the transmission register, and then the guide number is set to the same quantity as that in the pre-light-emission.

As a result, the stroboscope unit emits light for the second frame in the same quantity as that in the pre-light-emission. Therefore, the film is exposed to light in an appropriate quantity. For the third frame, the upward movement of the mirror is performed in step (212), and then the diaphragm is stopped in step (213). Then, the operation is, in step (214), branched to step (215) so that the sub-routine for setting the flash light photographing operation starts. Then, the operation proceeds to step (313). After the register AFB has been made to be 2, the operation is branched to step (315).

(315): PGNR+one step is set to the transmission register, and the guide number is set to a value higher than the pre-light-emission by one step.

Therefore, the stroboscope unit emits light with the guide number which is, by one step, larger than that for the pre-light-emission. Therefore, the film is exposed to light in a step higher by one step.

Since the register AFB has been made to be 2 in step (225), the operation is branched to step (228). That is, if the flash light bracket photographing operation has been performed for the three continuous frames, the operation is branched to step (228).

(228): Pre-light-emission flag PREOK is cleared, the register AFB is set to be 00H so that the mode is returned to the normal flash light photographing mode.

As described above, the first embodiment has the structure such that the quantity of light to be emitted from the stroboscope unit at the time of performing the photographing operation is determined in accordance with the quantity of light emitted in the pre-light-emission. When the release button is depressed, pictures are take on three continuous frames in the flash light photographing operation. At this time, the films are sequentially exposed to light in the photographing order with a quantity of one-step under quantity, an appropriate quantity and a one-step over quantity. Thus, the flash light bracket photographing operation can be performed in the stepped manner. If the quantity of emitted light, which is larger by one step calculated in accordance with the quantity of light obtained in the pre-light-emission, is larger than the maximum quantity of light that can be emitted by the stroboscope unit, an alarm is previously issued to the photographer to inhibit the flash light bracket photographing operation.

Although the bracket operation is performed at each step, ½ step or ⅓ step operation may, of course, be performed. Moreover, a structure may be employed in which the number of steps is set by a user. The exposing order is not limited to the order as the under exposure, the appropriate exposure and the over exposure. A structure may be employed in which the appropriate exposure, the over exposure and the under exposure are performed sequentially. Another structure may be employed in which the appropriate exposure, the under exposure and the over exposure are performed sequentially.

Although the camera according to this embodiment has the arrangement such that the pre-light-emission is performed by a switch individually provided from the release button, the pre-light-emission may, of course, be performed by the first stroke or the second stroke of the release button.

Second Embodiment

Figure 7B:
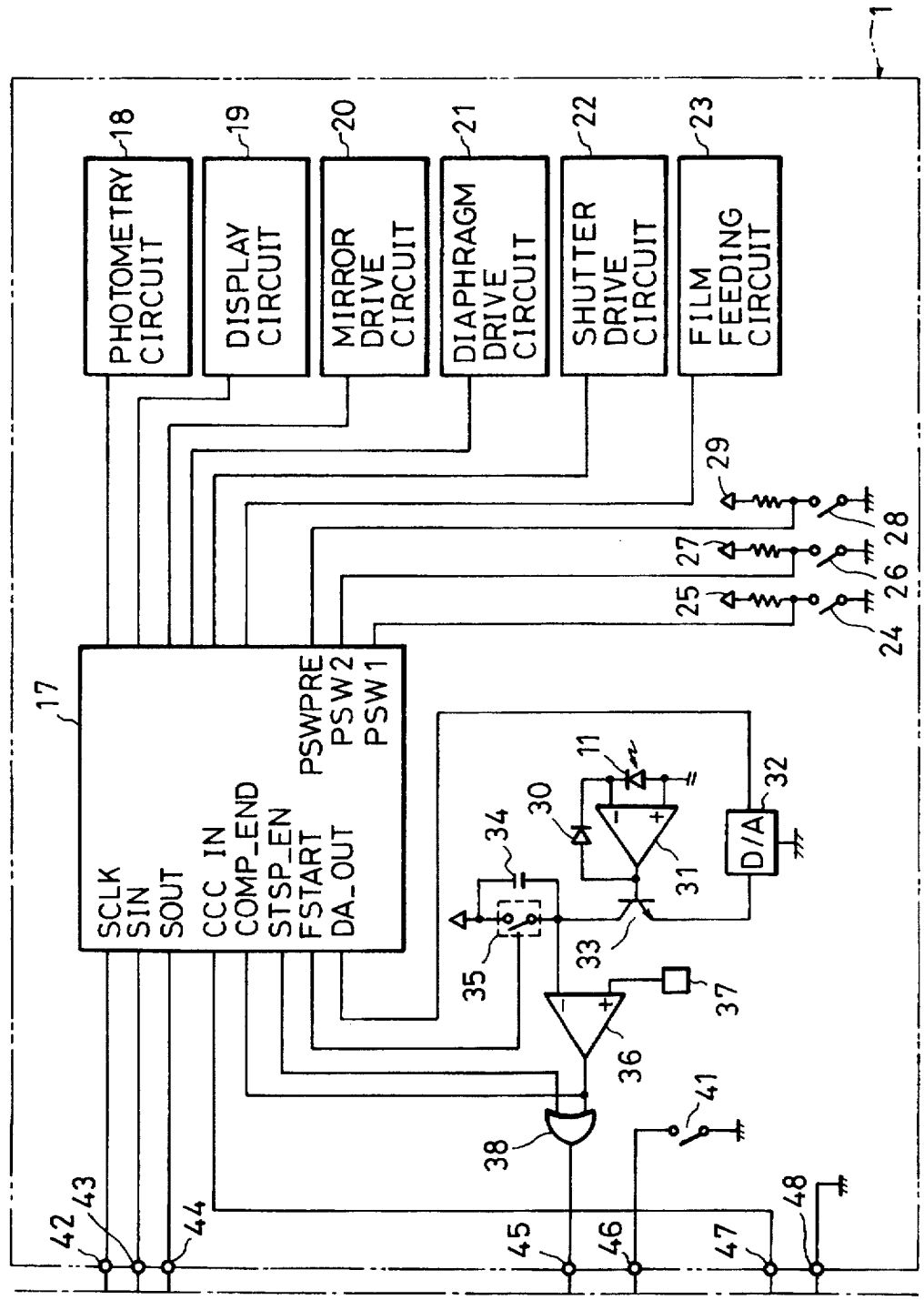
FIG. 7 consisting of FIGS. 7A and 7B, is a schematic view showing the electrical structure of a camera according to a second embodiment of the present invention.

Referring to FIGS. 7 to 11, a second embodiment of the present invention will now be described. The description will be made about portions different from those according to the first embodiment. FIG. 7 is a circuit diagram showing a camera according to the second embodiment. Elements having the same functions as those according to the first embodiment are given the same reference numerals.

A circuit in the stroboscope unit according to this embodiment has a structure such that the gates 71, 72, 73 and 78 are omitted from the structure according to the first embodiment, a novel AND gate 80 is added, and the port PRE—OUT is omitted from the stroboscope-side microcomputer 68.

In the circuit in the body 1 of the camera, the resistor 39 and LED 49 are omitted from the structure of the first embodiment, the output from the comparator 36 is connected to the input of the microcomputer 17 for the camera, the output port PWLED is omitted and novel input port COMP—END is added.

Figures 8, 8A:
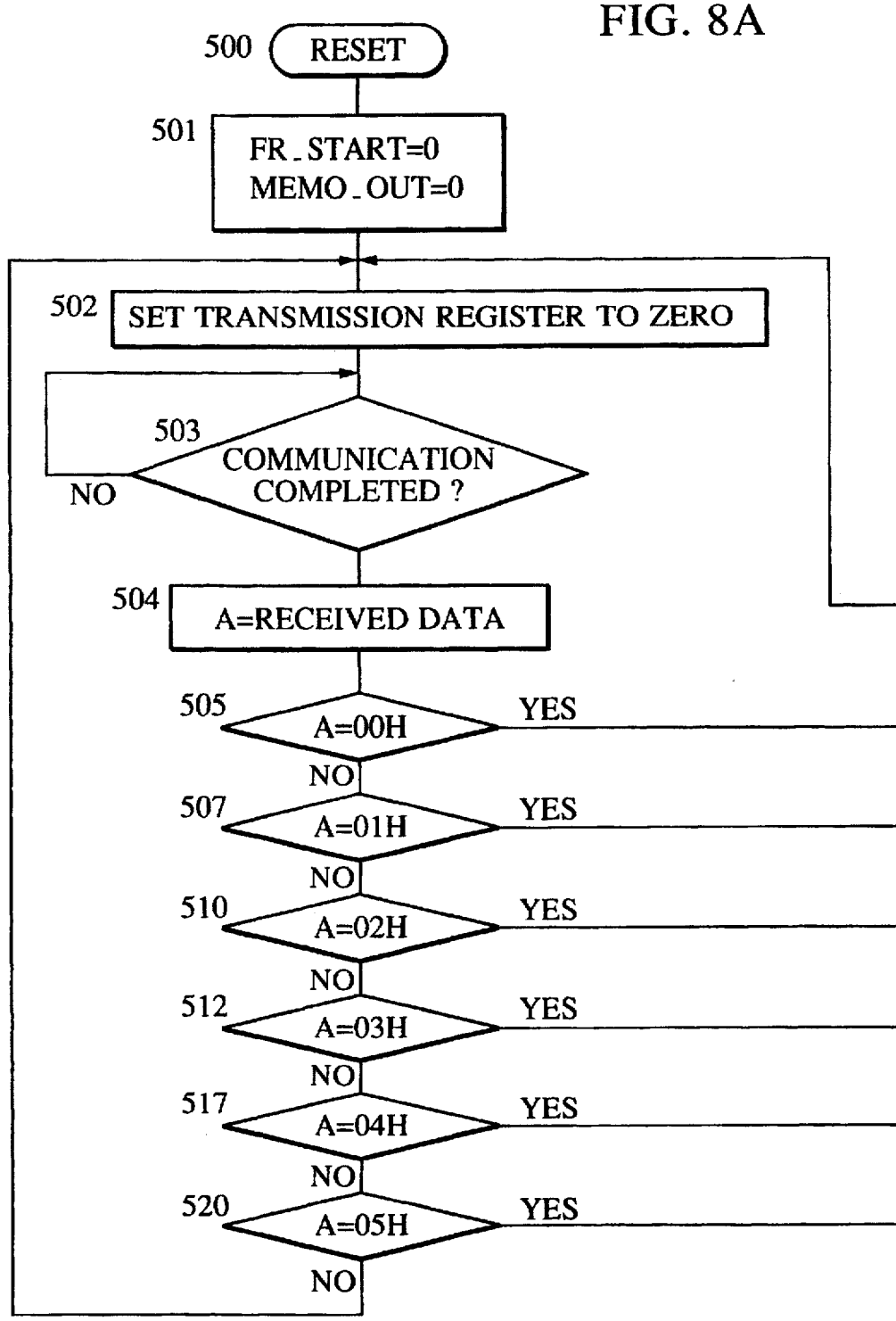
FIG. 8 consisting of FIGS. 8A, 8B, and 8C, is a flow chart showing the function and control operation of the stroboscope-side microcomputer 68 shown in FIG. 7.
Figure 8B:
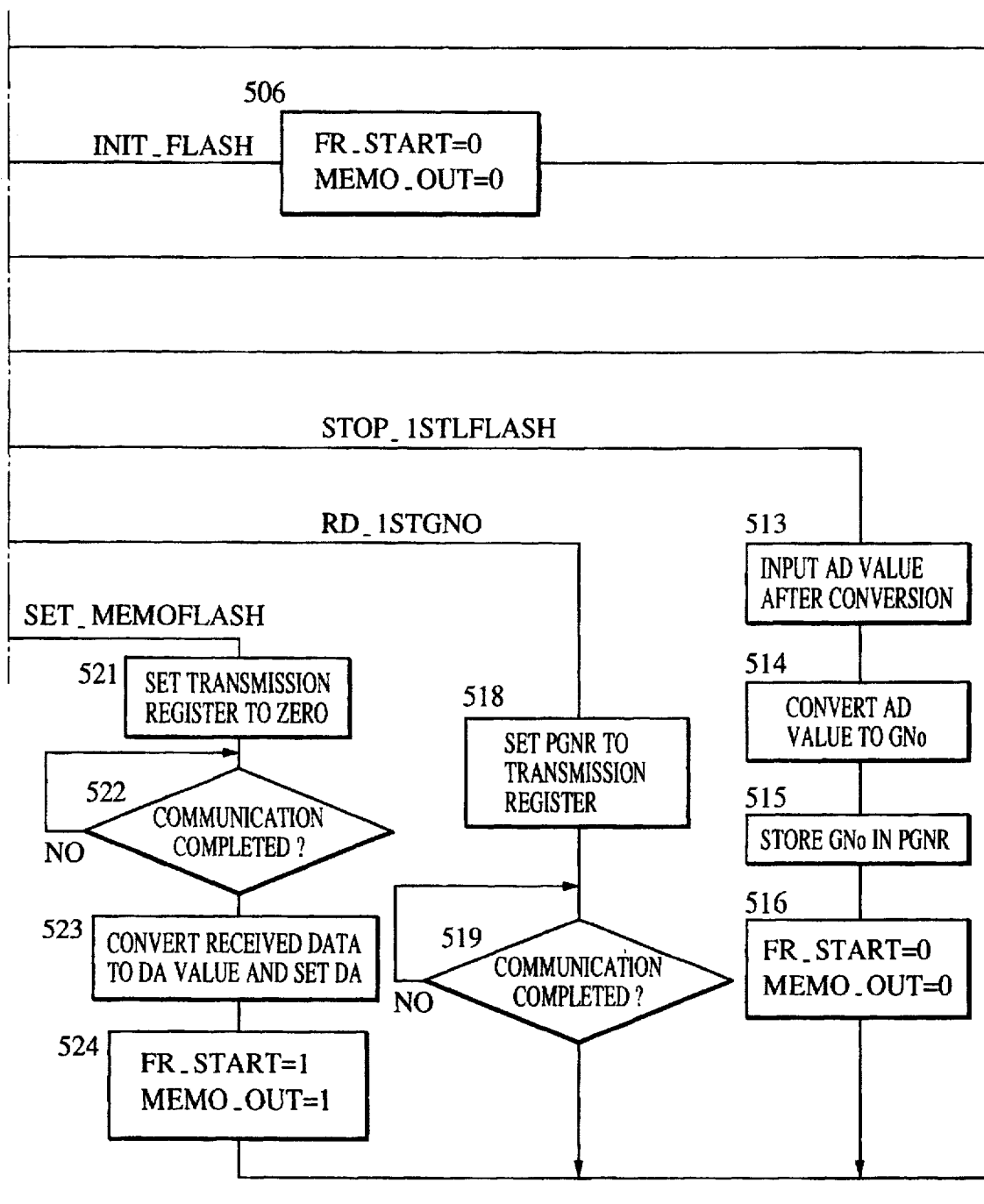
Figure 8C:
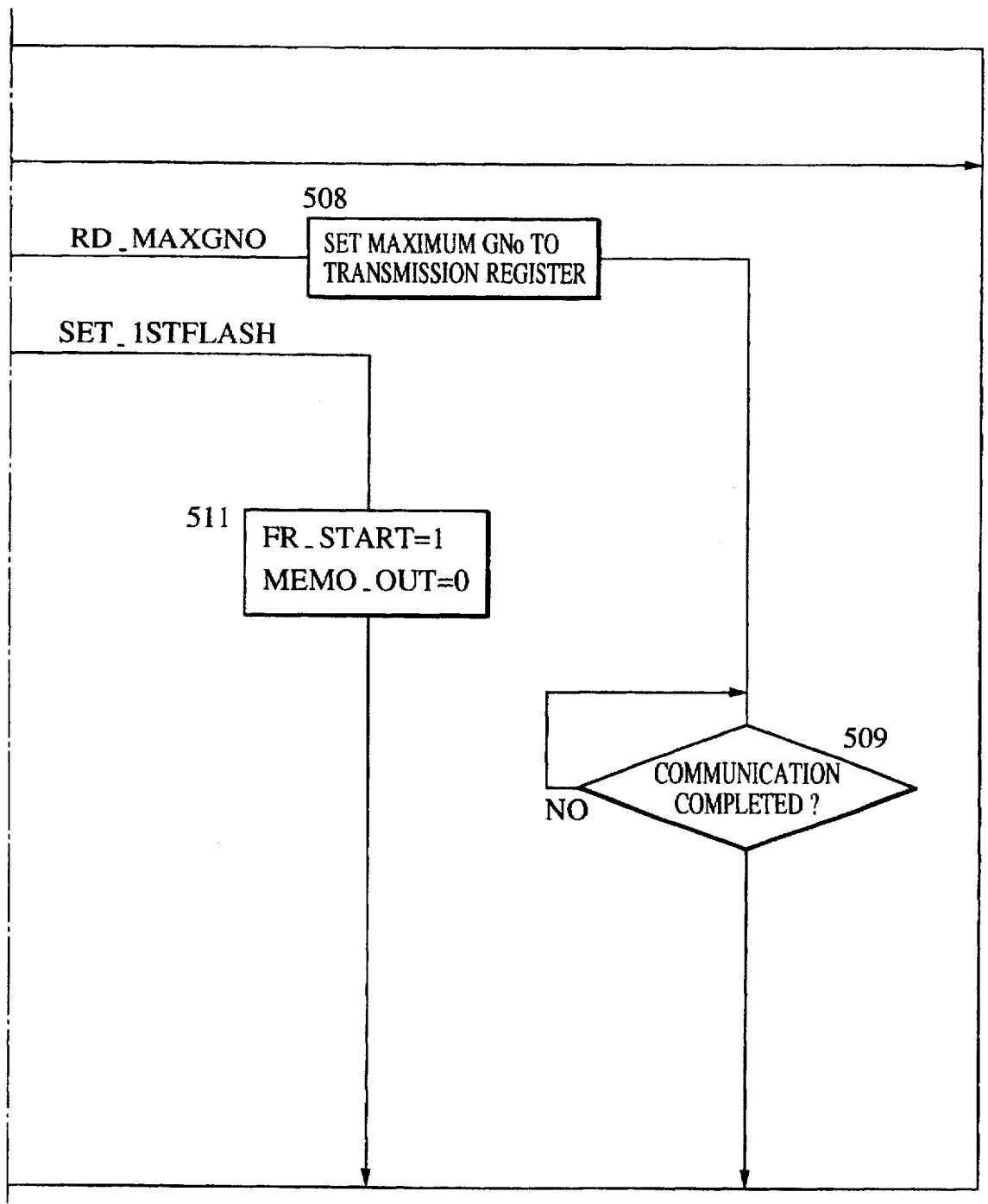

The operation of the stroboscope-side microcomputer 68 will now be described with reference to a flow chart shown in FIG. 8. When the power switch 50 of the stroboscope unit 2 is switched on, the stroboscope-side microcomputer 68 starts operating while performing resetting in step (500) shown in FIG. 8.

(501): 0 is transmitted to port FR—START and port MEMO—OUT. When 0 has been transmitted to port FR—START, the analog switch 64 is switched on so that the two ends of the integrating capacitor 63 are short-circuited, causing charges stored in the integrating capacitor 63 to be cleared. By transmitting 0 to port MEMOR—OUT, the circuit is initialized.

The foregoing state is called a "light emission storage mode".

Since the operations to be performed in step (502) to step (509) are the same as those to be performed in step (102) to step (109) according to the first embodiment shown in FIG. 2, the foregoing operations are omitted from the description.

(511): A requirement command of the stroboscope-side microcomputer 68 for performing preparation for storing main light emission. 1 is transmitted to port FR—START to switch the analog switch 64 off so that the capacitor 63 is brought into a state where it is able to perform integration. 0 is transmitted to port MEMO—OUT so that the mode of the stroboscope-side microcomputer 68 is switched to the light emission storage mode, and then the operation proceeds to step (502).

(512): If the register A is equal to 03H, then the operation proceeds to step (513).

(513): A requirement command of the stroboscope-side microcomputer 68 for completion of storage of main light emission. Since the voltage corresponding to charges stored in the integrating capacitor 63 realized due to an electric current generated in the photodiode 16 due to main light emission appears in the output from the calculation amplifier 62, it is A/D-converted in the A/D converter 65 and fetched.

(514): The voltage value obtained by A/D conversion is converted into a guide number. If light has been emitted in the pre-light-emission operation in a quantity corresponding to the guide number 16, 28H is given.

(515): The guide number is stored in the register PGNR of the stroboscope-side microcomputer 68.

(516): 0 is transmitted to port FR—START so that the analog switch 64 is switched on to discharge charges stored in the capacitor 63.

0 is transmitted to port MEMO—OUT so that the state of the stroboscope-side microcomputer is switched to the light emission storage mode. Immediately after this, the operation returns to step (502).

(517): If the register A is equal to 04H, then the operation proceeds to step (518).

(518): A requirement command of the stroboscope-side microcomputer 68 for transmitting the guide number for the pre-light-emission. The value of the register PGNR, in which the guide number with which the pre-light-emission has been performed is stored, is set to the transmission register.

(519): Serial communication is waited for. After data has been transferred to the microcomputer 17 the camera, the operation is returned to step (502).

(520): If the register A is equal to 05H, the operation proceeds to step (521). Since other data is a result of an error in the communication, the operation is returned to step (502).

(521): A requirement command of the stroboscope-side microcomputer 68 for performing preparation for light emission in accordance with the set guide number. 0 is set to the transmission register.

(522): Transmission of data from the microcomputer 17 for the camera is waited for. If data has been transmitted, the operation proceeds to step (523).

(523): The received guide number is converted into a voltage value which is, then, set to the D/A converter 67.

(524): 1 is transmitted to port FR—START. Thus, the analog switch 64 is switched off and the integrating circuit is brought into a state where it is able to perform integration. 1 is transmitted to port MEMO—OUT so that the state of the stroboscope-side microcomputer 68 is switched to the guide number light emission mode. Then, the operation is returned to step (502).

The stroboscope-side microcomputer 68 performs the foregoing operations, and then operates in accordance with the command communicated from the microcomputer 17 for the camera.

Figure 9A:
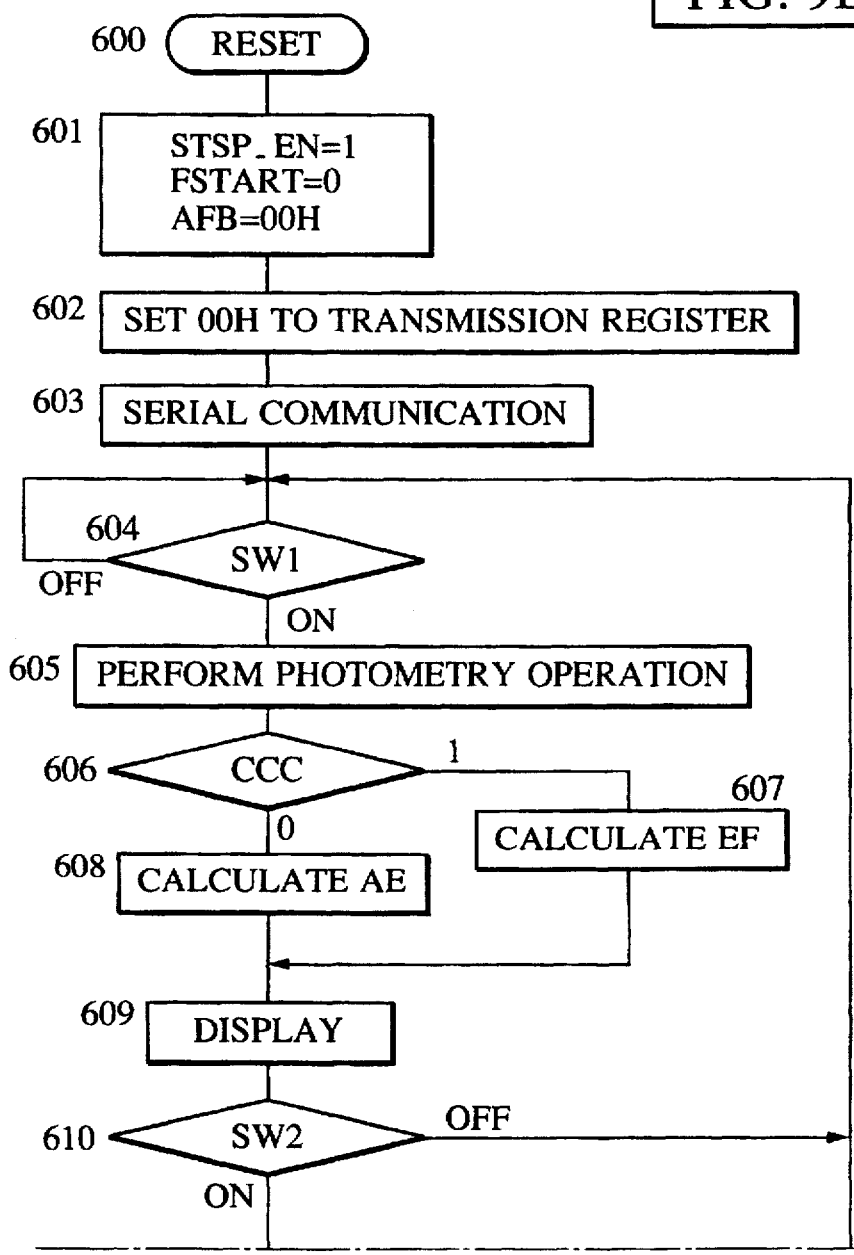
FIG. 9 consisting of FIGS. 9A and 9B, is a flow chart of a main routine showing the function and control operation of the microcomputer 17 for the camera shown in FIG. 7.
Figure 9B:
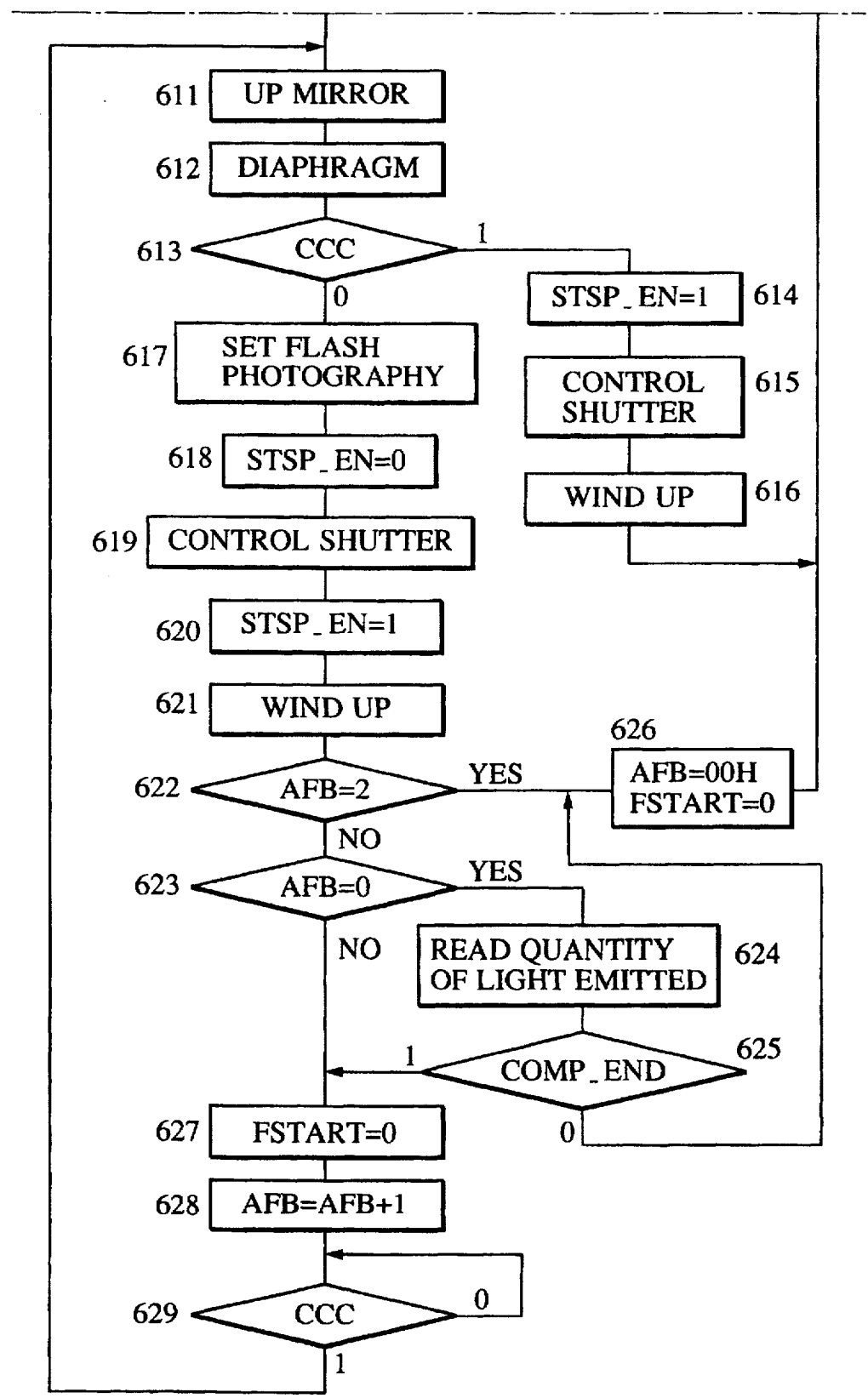

The operation of the microcomputer 17 for the camera will now be described with reference to a flow chart shown in FIG. 9.

When power has been supplied from the power source (not shown) to the camera, the microcomputer 17 for the camera starts operating while performing resetting in step (600). The normal flash light photographing operation will now be described.

(601): 1 is transmitted to port STSP—EN. 1 is transmitted to the terminal 45 for the signal for starting or stopping light emission. 0 is transmitted to port FSTART so that the analog switch 35 is switched on. 00H is stored in the register AFB.

(602): 00H is set to the transmission register in the microcomputer 17 for the camera.

(603): Serial communication with the stroboscope-side microcomputer 68 is performed by one byte. Thus, the stroboscope-side microcomputer 68 is set to a state where it stores light emission state.

(604): The description of the state of PSW1 is repeatedly performed. While circulating the foregoing loop, operation of the camera is waited for. When the switch SW1 is switched on, the operation proceeds to step (605).

(605): The photometric circuit 18 is turned on so that the brightness of an object is measured and the obtained value is converted into an EV value.

(606): The state of the terminal 47 for the charge completion signal is determined. If the state of port CCC—IN is high, then operation is branched to step (607). If the state is low, then the operation proceeds to step (608).

(607): If charging of the main capacitor 53 has been completed, then the EF calculation is performed. That is, an appropriate aperture value and the duration of time for the shutter are calculated from the value obtained in step (607) by calculations.

(608): If charging of the main capacitor 53 has not been completed, then the AE calculation is performed so that appropriate aperture value and the duration of time for the shutter are calculated from the measured value.

(609): The aperture value and the duration of time for the shutter calculated in step (608) are displayed on the display unit.

(610): The switch SW2 is checked in accordance with the second stroke of the release button. In a period until the switch SW2 is switched on, the operations in steps (604) to (610) are repeatedly performed. In a period where the switch SW1 is switched on, the brightness of the object is measured, and the appropriate aperture values and the duration of time for the shutter are sequentially calculated and displayed.

When the photographer has further depressed the release button and switches the switch SW2 on, the operation of the microcomputer 17 for the camera proceeds from step (610) to step (611).

(611): The mirror operating circuit 20 is operated so that the mirror is moved upwards. As a result, a state where the photographing operation can be performed is realized.

(612): The diaphragm is stopped to the aperture value calculated in step (607) or (608).

(613): The state of terminal 47 for the charge completion signal is determined. If charging of the main capacitor 53 has not been completed, then the operation is branched to step (614).

(614): Port STSP—EN is set to be 1. Although 1 has been set in step (601), port STSP—EN is again set to be 1. Therefore, the high level terminal 45 for the signal for starting or stopping light emission (the output from the OR gate 38) is maintained.

(615): The shutter is operated so that the film is exposed to light for the duration of time for the shutter calculated in step (608). Since the level of the terminal 45 for the signal for starting or stopping light emission is high though the X contact 41 has been turned on, the low level output from the AND gate 73 is maintained. Therefore, the stroboscope unit does not emit light.

(616): The film is wound, and then the operation is returned to step (604). The AE photographing operation is performed as described above.

If the level of the terminal 47 for the charge completion signal is high in step (613), then the operation proceeds to step (617) so that a sub-routine for setting the flash light photographing operation is called.

Figure 10:
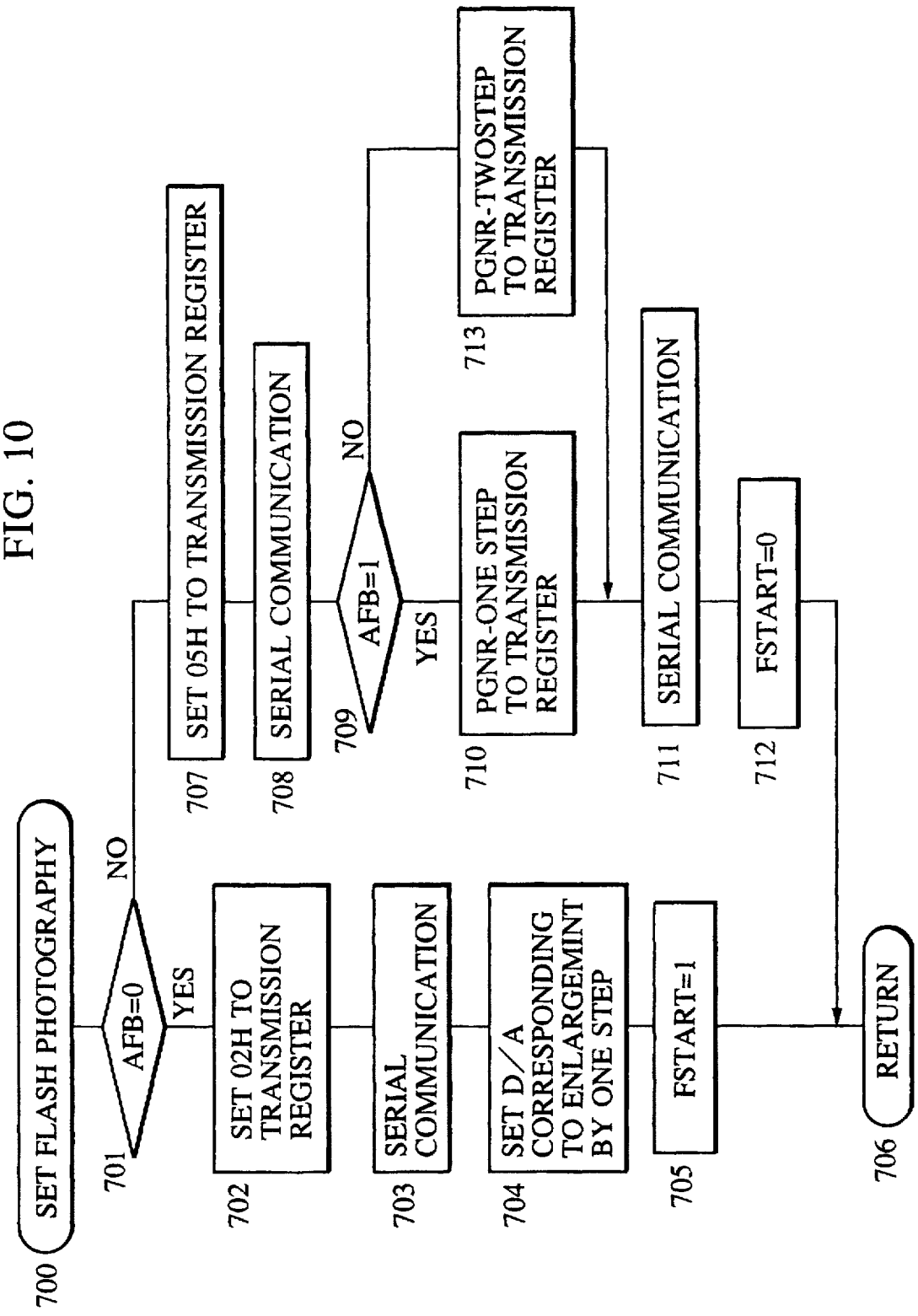
FIG. 10 is a flow chart of a sub-routine showing the contents of step 617 shown in FIG. 9.

After the sub-routine for setting the flash light photographing operation has been called, control starts at step (700) shown in FIG. 10.

(701): The AFB register is determined. Since it has been set to be 0 in step (601), the operation proceeds to step (702).

(702): 02H is set to the transmission register.

(703): Serial communication with the stroboscope-side microcomputer 68 is performed by one byte. The stroboscope-side microcomputer 68 receives the foregoing communication so that the stroboscope-side microcomputer 68 is brought into a state where it prepares for storage of the light emission state.

(704): The threshold of the D/A converter 32 is set. A value is set to the D/A converter 32, the value being over, by one step, a value set by the ISO setting member (not shown) and corresponding to the ISO sensitivity.

(705): 1 is transmitted to FSTART so that the analog switch 35 is switched off. Since the analog switch 35 has been switched on, the charges of the capacitor 34 for integrating the quantity of adjusted light have been cleared. Therefore, the level of the negative input of the comparator 36 is the same as that of the power supply voltage and higher than that of the reference voltage source 37. Thus, the comparator 36 transmits a low level output.

(706): The operation is returned to step (618) in the main routine.

(618): The level of the of port STSP—EN is lowered to a low level. Since also the level of the output from the comparator 36 is low, a low output is transmitted to the terminal 45 for the signal for starting or stopping light emission.

(619): The shutter 5 is operated to run as desired. The film is exposed to light for the time calculated in step (607). After the first blind of the shutter 5 has been moved, the X contact 41 is turned on. Since the level of the terminal 45 for the signal for starting or stopping light emission has been made to be a low level in step (618), the level of the output from the inverter 78 is switched to a high level when the level of the output from the inverter 77 has been made to be a high level and the level of the terminal 46 for the signal for turning on the X contact 41 has been lowered after the X contact 41 has been turned on. Thus, the level of the output from the AND gate 80 is switched to a high level. Therefore, the one-shot circuit 75 transmits high level signals for a predetermined time, causing the trigger circuit 60 to be turned on. Thus, the flash light emission xenon tube 14 is caused to emit light. The emitted flash light illuminates the object, thus causing reflected light to pass through the photographing lens and brought into contact with the surface of the film. Light reflected by the surface of the film is made incident upon the photodiode 11 for measuring flash light so that the photodiode 11 for measuring flash light generates an electric current corresponding to the intensity of incidental light. Although the collector electric current in the transistor 33, which is operated with the output from the calculation amplifier 31, initially is large, it is reduced as the capacitor 34 is discharged. After the collector electric current has been lowered to a level lower than the output voltage from the reference voltage source 37, the level of the output from the comparator 36 is inverted from a low level to a high level. The output signal passes through the OR gate 38 and the terminal 45 for the signal for starting or stopping light emission, followed by being received by the AND gate 71 of the stroboscope unit. Since the level of the output from port MEMO—OUT of the stroboscope-side microcomputer 68 is low, the output from the inverter 76 has been raised. Therefore, the level of the output from the AND gate 71 is inverted to a high level, the output being allowed to pass through the OR gate 69. Thus, the light-emission interruption circuit 61 is operated so that the light emission operation of the flash light emission xenon tube 14 is interrupted after the film has been exposed to light in a quantity over an appropriate value by one step. The quantity of light to be emitted from the stroboscope unit is determined by integrating the electric currents generated in the photodiode 16 for measuring the quantity of emitted flash light by the integrating circuit. After the film has been exposed to light for the time calculated in step (608), the second blind of the shutter is moved, and then the operation proceeds to step (620).

(620): By setting STSP—EN to be 1, the level of the output from the OR gate 38 is raised to a high level. If the film has been exposed to light in an appropriate quantity, the high level output from the OR gate 38 is maintained as it is. If the film cannot be exposed to light in an appropriate quantity though the stroboscope unit has fully emitted light due to the excessively long distance from the object, the level is switched to a high level.

(621): The film feeding control circuit 23 is turned on so that the film is wound by one frame and the shutter is charged.

(622): The value of the AFB register is checked. Since it has been set to be 00H in step (601), the operation proceeds to step (623).

(623): The value of the AFB register is checked. Since it has been set to be 00H, the operation proceeds to step (624).

(624): Reading of the quantity of light to be emitted in the sub-routine is called.

Figure 11:
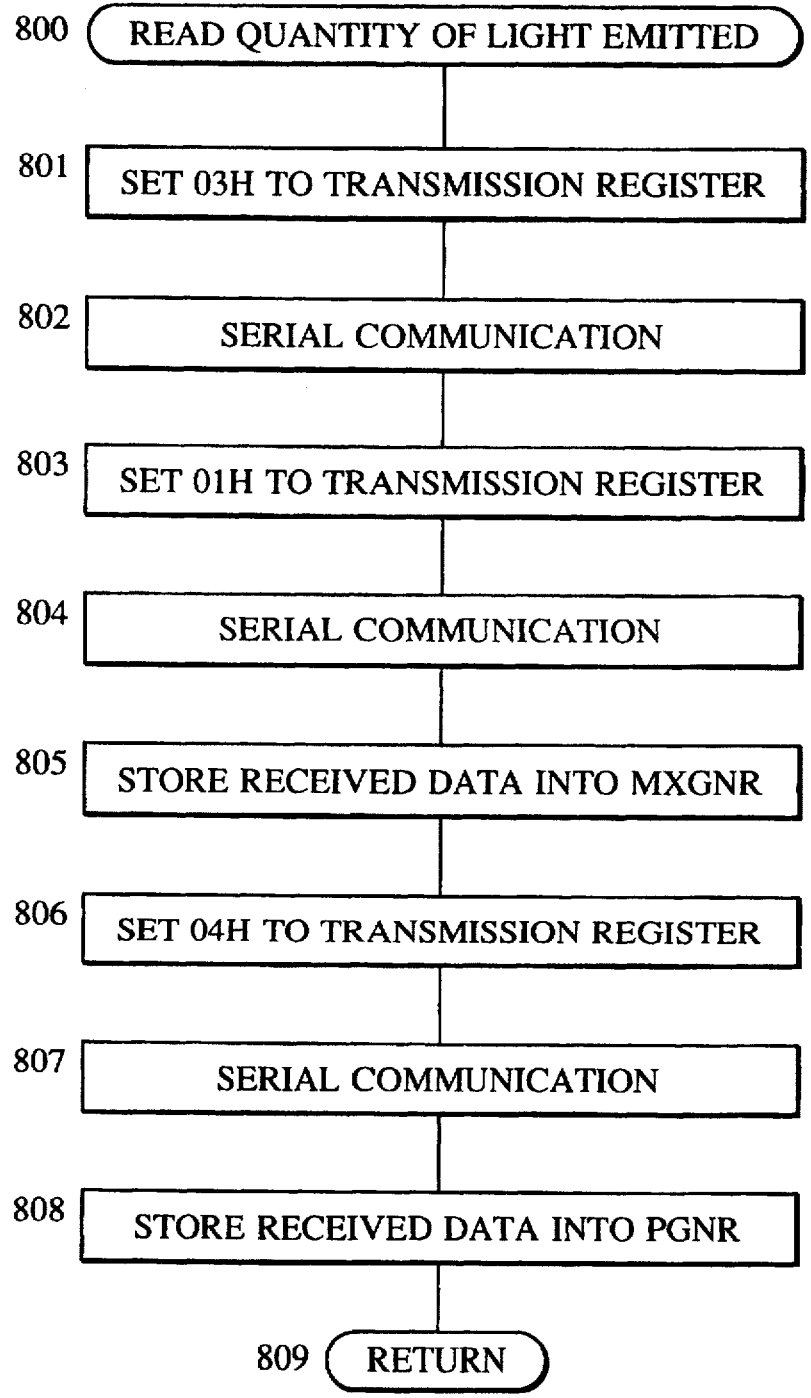
FIG. 11 is a flow chart of a sub-routine showing the contents of step 624 shown in FIG. 9.

When the quantity of light to be emitted in the sub-routine has been called, the operation starts at step (800) shown in FIG. 11.

(801): 03H is set to the transmission register.

(802): Serial communication with the stroboscope-side microcomputer 68 is performed. The stroboscope-side microcomputer 68 receives command 03H to A/D-convert the output from the calculation amplifier 62.

The calculation amplifier 62 generates voltage which is in proportion to the quantity of light to be emitted from the stroboscope unit. The stroboscope-side microcomputer 68 converts the value obtained by A/D conversion into a guide number which is then stored in the register PGNR. Then, the operation of the stroboscope-side microcomputer 68 is returned to the normal mode.

(803): 01H is set to the transmission register.

(804): Serial communication with the stroboscope-side microcomputer 68 is performed.

(805): The maximum light emission guide number is read from the stroboscope-side microcomputer 68 so as to be stored in register MXGNR.

(806): 04H is set to the transmission register.

(807): Serial communication with the stroboscope-side microcomputer 68 is performed.

(808): The stored main light emission guide number is read from the stroboscope-side microcomputer 68 so as to be stored in register PGNR.

(809): The operation is returned to step (625) in the main flow chart shown in FIG. 9.

(625): Port COMP EN is checked to determine the output from the comparator 36. If the level of the output is maintained at the low level, then the operation is branched to step (626). Since the quantity of emitted light is smaller than a predetermined level which is over by one step, the flash light bracket photographing operation is interrupted.

(626): FSTART is set to be 0 so that charges stored in the integrating capacitor 34 are discharged, and then 00H of the AFB is set. Then, the operation is returned to step (604).

(625): If the exposure could be performed with light, then the quantity of which was over by one step and the operation proceeds to step (627).

(627): FSTART is set to be 0 so that charges stored in the integrating capacitor 34 are discharged.

(628): AFB is increased by one.

(629): A moment at which the terminal 47 for the charge completion signal is made to be 1 is waited for. That is, complete charging of the main capacitor 53 is waited for, and then the operation is returned to step (611).

(701): Since AFB has been set to be 1 in step (628), the operation is branched to step (707).

(707): 05H is set to the transmission register.

(708): Serial communication with the stroboscope-side microcomputer 68 is performed. The stroboscope-side microcomputer 68 is brought to the guide number light emission mode.

(709): The value of AFB is checked. Since AFB=1, the operation proceeds to step (710).

(710): PGNR-one-step is set to the transmission register. The guide number is set to a value, by one step, under the level of the light emission which is over by one step, that is, an appropriate level. As a result, the stroboscope unit emits light in an appropriate quantity with respect to the second frame so that the film is exposed to light.

Similarly, the operation for the third frame proceeds to the upward movement of the mirror in step (611), stopping in step (612) and steps (613) and (617). Then, the operation proceeds to the sub-routine in which the operation proceeds to steps (701), (707) and (708), and then proceeds to step (709).

In step (709) the operation is branched to step (713) because AFB has been set to 2 in step (628).

(713): PGNR-two-step is set to the transmission register, and then the guide number is set to a level under than that for the first frame by two steps. That is, light is emitted with respect to the third frame with the guide number which is under by one step. Therefore, the film is exposed to light with the quantity under by one step.

After photographing of three continuous frames has been completed, the operation proceeds to steps (711), (712) and (706) so that the operation proceeds to step (618) in the main routine. Then, the operation is, in step (622), branched to step (626).

(626): AFB is set to be 00H, and then the operation is returned to step (604).

As described above, the second embodiment has the structure such that the first frame is exposed to light in a quantity over by one step. If light in a quantity over by one step can be generated, then photographing of three frames are continuously performed with light, the quantities of which are sequentially reduced in each step. Therefore, the flash light bracket photographing operation can be performed with light, the quantities of which is over by one step, appropriate and under by one step. If the first frame cannot be exposed to light with the over quantity, the flash light bracket photographing operation is interrupted. Therefore, a photographing operation without the bracket effect can be prevented.

Although the embodiments have the structure in which the bracket photographing operation is performed in quantities stepped sequentially, the quantities may, of course, be determined to be ½ steps and ⅓ steps. Moreover, the number of step may be determined by the user. The exposing order is not limited to the order as over, appropriate and under. For example, the exposure may be set as appropriate, over and under or the same may be set as appropriate, under and over.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A flash photographing system having an automatic bracket mode in which a quantity of flash light to be emitted from a flash unit is, in each flash photographing operation, shifted by a predetermined quantity so that plural times of flash photographing operations are performed, said flash photographing system comprising:

(a) a light-quantity detection circuit which detects light reflected from an object in a scene in which flash light is emitted from said flash unit so as to detect a reference quantity of light to be emitted in accordance with the quantity of reflected light;

(b) a setting circuit for setting data about quantity of light as data for use in performing each flash photographing operation, data about the quantity of light being, by a predetermined quantity, shifted from the reference quantity of light detected by said detection circuit; and (c) a control circuit for directly detecting a quantity of light emitted from the flash unit when the flash photographing operation is performed, and controlling the flash unit in accordance with data set by said setting circuit and the detected quantity of light.

2. A flash photographing system according to claim 1, wherein said control circuit has a monitor circuit for directly monitoring the quantity of light emitted from a flash light emitting portion of said flash unit, and a control unit for causing flash light to be emitted in the photographing operation until the quantity of light monitored by said monitor circuit holds a predetermined relationship with data set by said setting circuit.

3. A flash photographing system according to claim 1, further comprising a determining circuit for determining whether or not the flash photographing operation is performed in said automatic bracket mode in accordance with the detected reference quantity of emitted light.

4. A flash photographing system according to claim 1, further comprising a discrimination circuit for discriminating whether or not the quantity of light to be emitted in said automatic bracket mode is larger than maximum quantity of light that can be emitted by said flash unit.

5. A flash photographing system according to claim 1, wherein the reference quantity of emitted light is detected by said light-quantity detection circuit when a previous light emission operation is performed before an initial flash photographing operation is performed in said automatic bracket mode.

6. A flash photographing system according to claim 1, wherein the reference quantity of emitted light is detected by said light-quantity detection circuit when flash light is emitted when an initial flash photographing operation is performed in said automatic bracket mode.

7. A flash photographing system having an automatic bracket mode in which quantity of flash light to be emitted from a flash unit is, in each flash photographing operation, shifted by a predetermined quantity so that plural times of flash photographing operations are performed, said flash photographing system comprising:

(a) a first detection circuit which detects light reflected from an object in a scene in which flash light is emitted from said flash unit so as to discriminate whether or not the quantity of reflected light has reached a predetermined value;

(b) a second detection circuit which directly monitors the quantity of light emitted from a light emitting portion of said flash unit to detect quantities of emitted light until said first detection circuit discriminates that the quantity of reflected light has reached a predetermined value;

(c) a setting circuit for setting data about quantity of light as data for use in performing each flash photographing operation, data about the quantity of light being, by a predetermined quantity, shifted from reference quantity of light corresponding to the quantity of light detected by said second detection circuit; and (d) a control circuit for, in accordance with data set by said setting circuit, controlling quantity of light to be emitted from said flash unit when the flash photographing operation is performed.

8. A flash photographing system according to claim 7, wherein said control circuit has a control unit for causing flash light to be emitted in the photographing operation until the quantity of light monitored by said second detection circuit holds a predetermined relationship with data set by said setting circuit.

9. A flash photographing system according to claim 7 further comprising a determining circuit for determining whether or not the flash photographing operation is performed in said automatic bracket mode in accordance with the reference quantity of emitted light.

10. A flash photographing system according to claim 7, further comprising a discrimination circuit for discriminating whether or not the quantity of light to be emitted in said automatic bracket mode is larger than maximum quantity of light that can be emitted by said flash unit.

11. A flash photographing system according to claim 7, wherein the reference quantity of emitted light is detected by said first and second detection circuits when a previous light emission operation is performed before an initial flash photographing operation is performed in said automatic bracket mode.

12. A flash photographing system according to claim 7, wherein the reference quantity of emitted light is detected by said first and second detection circuits when flash light is emitted when an initial flash photographing operation is performed in said automatic bracket mode.

13. A flash photographing system for performing flash photographing operations while shifting a quantity of light to be emitted in each photographing operation, said flash photographing system comprising:

(a) a detection circuit for detecting a reference quantity of emitted light by emitting flash light;

(b) a storage circuit for storing the reference quantity of emitted light detected by said detection circuit;

(c) a light-emission-quantity determining circuit for determining one or more shifted quantities of light to be emitted during respective flash photographing operations, in accordance with the reference quantity of emitted light stored in said storage circuit; and (d) a light-quantity control circuit for directly detecting and controlling the quantity of light emitted during respective flash photographing operations.

14. A flash photographing system according to claim 13, wherein said light-emission-quantity determining circuit has a setting circuit for setting data about quantities of light corresponding to guide numbers respectively shifted by predetermined steps from guide numbers corresponding to the reference quantity of emitted light stored in said storage circuit, said data about the quantity of light being set as quantities of light to be used in respective flash photographing operations.

15. A flash photographing system according to claim 14, further comprising a light-quantity control circuit for controlling quantity of light to be emitted in accordance with data set by said setting circuit.

16. A flash photographing system according to claim 15, wherein said light-quantity control circuit has a monitor circuit which directly detects flash light emitted from a flash tube so as to monitor the quantity of emitted light and causes said flash bulb to emit light until the quantity of light monitored by said monitor circuit holds a relationship corresponding to data set in said setting circuit.

17. A flash photographing system for performing a flash photographing operation while shifting the quantity of flash light to be emitted in each photographing operation, said flash photographing system comprising:

(a) a detection circuit for detecting a reference quantity of emitted light by emitting flash light;

(b) a storage circuit for storing the reference quantity of emitted light detected by said detection circuit; and (c) a light-emission-quantity determining circuit for determining a quantity of light in each flash photographing operation in accordance with the reference quantity of emitted light stored in said storage circuit, wherein said light-emission-quantity determining circuit has a setting circuit for setting data about quantities of light corresponding to guide numbers respectively shifted by predetermined steps from guide numbers corresponding to the reference quantity of emitted light stored in said storage circuit, said data about the quantity of light being set as quantities of light to be used in respective flash photographing operations.

18. A flash photographing system for performing flash photographing operations while shifting a quantity of light to be emitted in each photographing operation, said flash photographing system comprising:

(a) a detection circuit for detecting a reference quantity of emitted light by emitting flash light;

(b) a light-emission-quantity determining circuit for determining one or more shifted quantities of light to be emitted during respective flash photographing operations, in accordance with the reference quantity of emitted light; and (c) a light-quantity control circuit for controlling the quantity of light emitted on the basis of said shifted quantities during respective flash photographing operations.

* * * * *

UNITED STATES PATENT AND TRADEMARK OFFICE
CERTIFICATE OF CORRECTION

PATENT NO. : 5,708,873
DATED : January 13, 1998
INVENTOR(S) : Ryuichi KOBAYASHI

It is certified that error appears in the above-identified patent and that said Letters Patent is hereby corrected as shown below:

Drawings:

Sheet 19

Figure 10

"ENLARGEMINT" should read --ENLARGEMENT--.
    "TWOSTEP" should read --TWO STEP--.

Column 3

Line 51, "and" should read --and is--.
    Line 53, "and" should read --and is--.

Column 5

Line 14, "A" should read --In a--.

Column 7

Line 14, "transmit" should read --transmits--.

Column 9

Lines 16-17, "step ¶(206)." should read --step (206).--.
    Line 20, ¶(205)" should read --(205)--.

Column 11

Line 62, "lowered" should read --lower--.

Column 17

Line 39, "take" should read --taken--.

UNITED STATES PATENT AND TRADEMARK OFFICE
CERTIFICATE OF CORRECTION

PATENT NO. : 5,708,873
DATED : January 13, 1998
INVENTOR(S) : Ryuichi KOBAYASHI

It is certified that error appears in the above-identified patent and that said Letters Patent is hereby corrected as shown below:

Column 18

Line 5, "embodiment, Fig. 7" should read --embodiment. ¶Fig. 7--.

Column 19

Line 19, "¶(502)." should read --(502).--.

Column 20

Line 60, "¶(702)." should read --(702).--.

Column 21

Line 15, "of" (second occurrence) should be deleted.
Line 22, "¶(607)." should read --(607).--.

Column 22

Lines 52-53, "step ¶(626)." should read --step (626).--.

UNITED STATES PATENT AND TRADEMARK OFFICE
CERTIFICATE OF CORRECTION

PATENT NO. : 5,708,873
DATED : January 13, 1998
INVENTOR(S) : Ryuichi Kobayashi

It is certified that error appears in the above-indentified patent and that said Letters Patent is hereby corrected as shown below:

<u>Column 23</u>

Line 45, "is" should read --are--.
    Line 55, "step" should read --steps--.

Signed and Sealed this

Twenty-eighth Day of July, 1998

Attest:

BRUCE LEHMAN

*Attesting Officer*      *Commissioner of Patents and Trademarks*